US012611675B2

(12) United States Patent
Shin et al.

(10) Patent No.: US 12,611,675 B2
(45) Date of Patent: Apr. 28, 2026

(54) MULTI-CHAMBER CARTRIDGE AND NUCLEIC ACID EXTRACTION MODULE COMPRISING THE SAME

(71) Applicant: Pukyong National University Industry—University Cooperation Foundation, Busan (KR)

(72) Inventors: Joong Ho Shin, Busan (KR); Won Han, Busan (KR); Thang Tran Huy Le, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 502 days.

(21) Appl. No.: 18/317,000

(22) Filed: May 12, 2023

(65) Prior Publication Data

US 2023/0364620 A1 Nov. 16, 2023

(30) Foreign Application Priority Data

May 13, 2022 (KR) ........................ 10-2022-0058678

(51) Int. Cl.
*B01L 7/00* (2006.01)

(52) U.S. Cl.
CPC ......... *B01L 7/52* (2013.01); *B01L 2300/0874* (2013.01); *B01L 2400/0478* (2013.01)

(58) Field of Classification Search
CPC ............... B01L 7/52; B01L 2300/0874; B01L 2400/0478; B01L 2300/044;
(Continued)

(56) References Cited

U.S. PATENT DOCUMENTS 5,456,885 A * 10/1995 Coleman ............... B01L 3/0217
422/549

FOREIGN PATENT DOCUMENTS

JP 2004208654 A * 7/2004
KR 0157657 B1 7/1998
(Continued)

OTHER PUBLICATIONS

Korean Office Action issued in Korean Application No. 10-2022-0058678, dated Aug. 21, 2024, in 12 pages.

*Primary Examiner* — Liban M Hassan
(74) *Attorney, Agent, or Firm* — Knobbe, Martens, Olson & Bear, LLP

(57) ABSTRACT

A multi-chamber cartridge and a nucleic acid extraction module including the same are provided. The multi-chamber cartridge according to an aspect of the present invention may include a sample chamber including a first tube which is an elongated hollow type, a sample chamber body in which a mixing space is formed and one end of the first tube is disposed in the mixing space, a first pressure gasket which can be coupled to the inside of the first tube and is movable along the inner peripheral surface of the first tube, a first separation gasket which is disposed on one surface of the first pressure gasket, coupled to the inside of the first tube, and movable along the inner peripheral surface of the first tube, and a first plunger having one end coupled to the other surface of the first pressure gasket and pressing the first pressure gasket; and a cartridge body which includes an accommodating part in which the sample chamber is detachably accommodated.

16 Claims, 15 Drawing Sheets

1

(58) Field of Classification Search

CPC ......... B01L 2300/047; B01L 2300/049; B01L 2300/0672; B01L 3/50825; B01L 3/527; B01L 3/502715; B01L 9/06; G01N 35/00069; G01N 35/10; G01N 2035/00128; G01N 2035/00346; G01N 2035/00564; G01N 2035/0439; C12N 15/1003; C12Q 1/6806

See application file for complete search history.

(56) References Cited

FOREIGN PATENT DOCUMENTS

| | | | | | |
|---|---|---|---|---|---|
| KR | 20100051494 | A | * | 5/2010 | ............... C12N 5/06 |
| KR | 20110086543 | A | * | 7/2011 | ......... A61B 10/0283 |
| KR | 2012-0061714 | A | | 6/2012 | |
| KR | 2019-0047571 | A | | 5/2019 | |
| KR | 2022-0016595 | A | | 2/2022 | |

* cited by examiner (a) (b)

(a)

(b)

MULTI-CHAMBER CARTRIDGE AND NUCLEIC ACID EXTRACTION MODULE COMPRISING THE SAME

CROSS-REFERENCE TO RELATED APPLICATION

This application claims priority to and the benefit of Korean Patent Application No. 10-2022-0058678, filed on May 13, 2022, the disclosure of which is incorporated herein by reference in its entirety.

TECHNICAL FIELD

The present invention relates to a multi-chamber cartridge and a nucleic acid extraction module including the same, and more specifically to a multi-chamber cartridge which is capable of automatically extracting nucleic acids from a sample, inspecting the existence of target nucleic acids and performing pretreatment for extracting nucleic acids.

BACKGROUND ART

Nucleic acid (DNA, RNA) amplification technology has been widely used for R&D and diagnostic purposes in the fields of life science, genetic engineering and medicine. In particular, among various nucleic acid amplification techniques, the nucleic acid amplification technique using a polymerase chain reaction (PCR) has been widely used. Polymerase chain reaction can be used to amplify a specific sequence in the genome as needed.

Such a polymerase chain reaction is also used in a nucleic acid test system that determines whether a nucleic acid is a target nucleic acid to be detected after amplifying a certain nucleic acid. In general, the nucleic acid test system amplifies nucleic acid through a polymerase chain reaction and determines whether it is a specific nucleic acid through fluorescence signals that are generated by irradiating light.

In this case, for the polymerase chain reaction, a pretreatment process of extracting nucleic acids from samples including nucleic acids must be necessarily accompanied. Such a process passes through complicated processes such as pipetting and centrifugation multiple times from the pretreatment of a sample including the target nucleic acid to mixing with the polymerase chain reaction reagent. In such a process, there has been a problem in that it is difficult to easily apply the nucleic acid test in real time in the field, because it requires professional personnel who can perform the same, and expensive equipment and space are required in the pretreatment process of extracting nucleic acid from a sample.

DISCLOSURE

Technical Problem

In order to solve the above problems, an object of the present invention is to provide a multi-chamber cartridge which is capable of automating sample pretreatment and nucleic acid extraction, and a nucleic acid extraction module including the same.

In addition, an object of the present invention is to provide a multi-chamber cartridge that can be used in real time in the field by reducing the size of a system for extracting nucleic acids and detecting nucleic acids and simplifying the operation, and a nucleic acid extraction module including the same.

The problems of the present invention are not limited to the problems mentioned above, and other problems that are not mentioned will be clearly understood by those skilled in the art from the description below.

Technical Solution

The multi-chamber cartridge according to an exemplary embodiment of the present invention may include a sample chamber including a first tube which is an elongated hollow type, a sample chamber body in which a mixing space is formed and one end of the first tube is disposed in the mixing space, a first pressure gasket which can be coupled to the inside of the first tube and is movable along an inner peripheral surface of the first tube, a first separation gasket which is disposed on one surface of the first pressure gasket, coupled to the inside of the first tube and movable along the inner peripheral surface of the first tube, and a first plunger having one end coupled to the other surface of the first pressure gasket and pressing the first pressure gasket; and a cartridge body which comprises an accommodating part in which the sample chamber is detachably accommodated, wherein the first tube includes a first sample space which is defined by an inner surface of the first tube, one surface of the first separation gasket and one surface of the first pressure gasket.

In this case, a basic sample is placed in the mixing space, wherein a first sample is placed in the first sample space, and wherein the first sample is transferred to the mixing space as the first separation gasket is separated from the first tube as the other end of the first plunger is pressed toward the mixing space.

In this case, the first tube may be formed such that the cross-sectional area which is perpendicular to the longitudinal direction of the first tube in the inner space of the first tube is smaller than the cross-sectional area which is perpendicular to the extending direction of the first tube in the mixing space.

In this case, the sample chamber may further include a second separation gasket which is disposed on the other surface of the first separation gasket, can be coupled to the inside of the first tube and is movable along the inner peripheral surface of the first tube, wherein the first tube includes a second sample space which is defined by an inner surface of the first tube, the other surface of the first separation gasket and one surface of the second separation gasket.

In this case, a basic sample is placed in the mixing space, wherein a first sample is placed in the first sample space, wherein a second sample is placed in the second sample space, and wherein the second sample and the first sample are sequentially transferred to the mixing space as the second separation gasket and the first separation gasket are sequentially separated from the first tube as the other end of the first plunger is pressed toward the mixing space.

In this case, the sample chamber may further include a second tube which is a hollow type, arranged side by side with the first tube and extended in length, one end of which is disposed in the mixing space; a second pressure gasket which can be coupled to the inside of the second tube and is movable along an inner peripheral surface of the second tube; and a second separation gasket which is disposed on one surface of the second pressure gasket, coupled to the inside of the second tube and movable along the inner peripheral surface of the second tube.

Meanwhile, the multi-chamber cartridge according to another exemplary embodiment of the present invention may include a sample chamber including a first tube which is an elongated hollow type, a sample chamber body in which a mixing space is formed and one end of the first tube is disposed in the mixing space, a first pressure gasket which can be coupled to the inside of the first tube and is movable along an inner peripheral surface of the first tube, a first separation gasket which is disposed on one surface of the first pressure gasket and fixed to the inside of the first tube, a first drilling member which protrudes from one surface of the first pressure gasket toward the first separation gasket and a first plunger having one end coupled to the other surface of the first pressure gasket and pressing the first pressure gasket; and a cartridge body which includes an accommodating part in which the sample chamber is detachably accommodated, wherein the first tube includes a first sample space which is defined by an inner surface of the first tube, one surface of the first separation gasket and one surface of the first pressure gasket.

In this case, a basic sample is placed in the mixing space, wherein a first sample is placed in the first sample space, and wherein the first sample is transferred to the mixing space by the first drilling member that breaks the first separation gasket as the other end of the first plunger is pressed toward the mixing space.

In this case, the first drilling member may be formed such that the cross-sectional area which is perpendicular to the protruding direction decreases toward the first separation gasket.

In this case, the first separation gasket may be integrally formed with the first tube, and an edge portion of the first separation gasket may be formed to be thinner than a central portion of the first separation gasket.

In this case, the first drilling member may be formed to press an edge portion of one surface of the first separation gasket.

In this case, the sample chamber may further include a second tube which is a hollow type, arranged side by side with the first tube and extended in length, one end of which is disposed in the mixing space; a second pressure gasket which can be coupled to the inside of the second tube and is movable along an inner peripheral surface of the second tube; a second separation gasket which is disposed on one surface of the second pressure gasket and fixed to the inside of the second tube; and a second drilling member which protrudes from one surface of the second pressure gasket toward the second separation gasket, wherein the second tube includes a second sample space which is defined by an inner surface of the second tube, one surface of the second separation gasket and one surface of the second pressure gasket.

In this case, the first plunger may be screw-coupled to one side of the inner peripheral surface of the first tube.

In this case, the sample chamber may further include a locking part for limiting the movement direction of the first plunger such that the first plunger is movable only in a direction toward the mixing space.

In this case, the locking part may include a first locking protrusion which protrudes such that an inclined surface is formed on one side of an outer peripheral surface of the first plunger toward the mixing space, and a locking surface is formed toward a direction opposite to the direction toward the mixing space; and a second locking protrusion which is formed in plurality at a predetermined interval along the longitudinal direction of the first tube in which an inclined surface is formed on one side of the inner peripheral surface of the first tube in a direction opposite to the direction toward the mixing space and protrudes such that a locking surface is formed toward the mixing space, wherein the first locking protrusion and the second locking protrusion are elastically deformed such that the first plunger can move toward the mixing space while the first locking protrusion and the second locking protrusion are arranged side by side.

In this case, the first plunger can move in a direction opposite to the direction toward the mixing space while the first and second locking protrusions are disposed to be misaligned.

The nucleic acid extraction module provided with a multi-chamber cartridge according to an exemplary embodiment may include the multi-chamber cartridge, which further comprises an opening that is formed to expose one side of the sample chamber to the outside; and a first heater which includes a heating unit for heating one side of the sample chamber through the opening by controlling time and temperature.

In this case, the heating unit may be disposed adjacent to one side of the sample chamber to heat the sample chamber and can reciprocate so as to be separated from the sample chamber when the heating is finished.

In this case, the heating unit may be formed in a shape corresponding to one side of the sample chamber to increase a contact area with one side of the sample chamber.

In this case, the nucleic acid extraction module provided with a multi-chamber cartridge may further include a pressing member for separating the first separation gasket from the first tube into the mixing space by pressing the other end of the plunger such that the first sample is transferred from the first sample space to the mixing space.

In this case, the plunger may be screw-coupled to one side of the inner peripheral surface of the first tube, and wherein the pressing member can be coupled to the other side of the plunger and presses the plunger to rotate in one direction or the other direction.

In this case, the nucleic acid extraction module may further include a spring member for providing an elastic force to the other side of the plunger such that the pressing member remains coupled to the other side of the plunger.

Meanwhile, the nucleic acid extraction module provided with a multi-chamber cartridge according to an exemplary embodiment of the present invention may further include the multi-chamber cartridge, in which a basic sample is placed in the mixing space, and a first sample is placed in the first sample space; and a first driving unit for rotating the multi-chamber cartridge in one direction or the other direction with an axis parallel to the extension direction of the first tube as a central axis such that the first sample and the base sample are mixed.

Advantageous Effects

The multi-chamber cartridge according to an exemplary embodiment of the present invention and the nucleic acid extraction module including the same can easily extract nucleic acids regardless of the skill level of an operator by automating pretreatment and nucleic acid extraction.

In addition, the multi-chamber cartridge according to an exemplary embodiment of the present invention and the nucleic acid extraction module including the same can be used in real time in the field by reducing the size of a system for nucleic acid extraction by moving the sample using a pressure difference in the container and simplifying the operation.

The effects of the present invention are not limited to the above effects, and it should be understood to include all effects that can be inferred from the description of the present invention or the configurations of the invention as described in the claims.

MODES OF THE INVENTION

Figure 1:
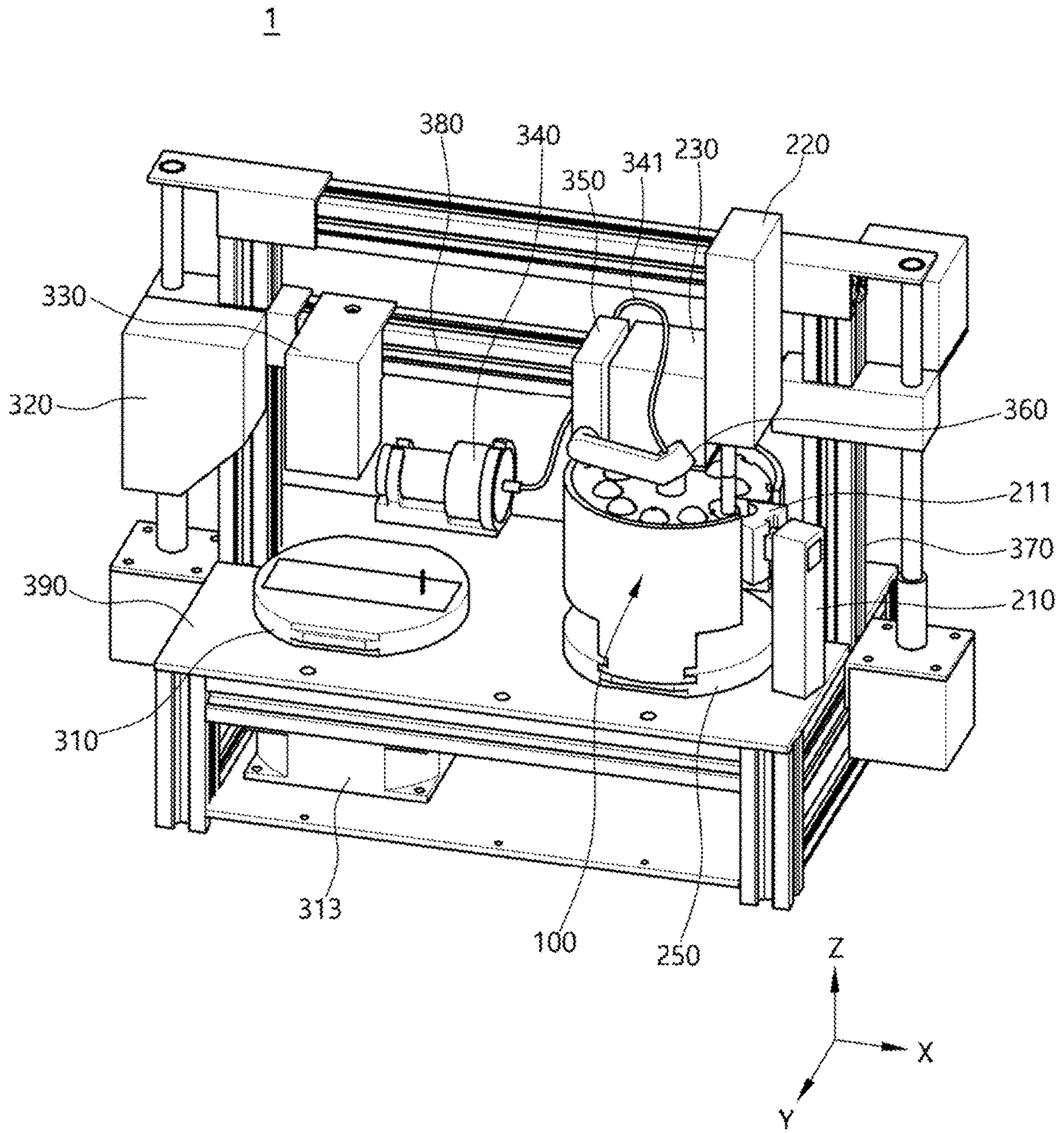
FIG. 1 is a perspective view of the nucleic acid test system provided with a multi-chamber cartridge according to an exemplary embodiment of the present invention.

Hereinafter, with reference to the accompanying drawings, the exemplary embodiments of the present invention will be described in detail so that those skilled in the art can easily practice the present invention. The present invention may be embodied in many different forms and is not limited to the exemplary embodiments set forth herein.

In order to clearly describe the present invention in the drawings, parts that are irrelevant to the description are omitted, and the same reference numerals are assigned to the same or similar components throughout the specification.

In addition, singular expressions include plural expressions unless the context clearly indicates otherwise. Terms used in the exemplary embodiments of the present invention may be interpreted as meanings commonly known to those skilled in the art unless otherwise defined.

Hereinafter, FIG. 1 will be described by defining the direction of the X-axis as the left direction, defining the direction of the Y-axis as the forward direction, and defining the direction of the Z-axis as the upward direction. In this case, the right direction, the forward direction and the upward direction define relative directions for the convenience of description, and they may be different directions according to the directions in which the nucleic acid detection system provided with a nucleic acid extraction module according to an exemplary embodiment of the present invention is placed or the viewing position thereof.

In the drawings, the thickness or size is exaggerated in order to clearly express the characteristics of the configuration, and the thickness or size of the configuration shown in the drawings is not necessarily shown to be the same as the actual one.

Terms such as 'first' and 'second' may be used to describe various elements, but the elements should not be limited by the above terms. The above terms may only be used for the purpose of distinguishing one component from another. For example, a 'first element' may be termed a 'second element', and similarly, a 'second element' may also be termed a 'first element' without departing from the scope of the present invention.

Figure 2:
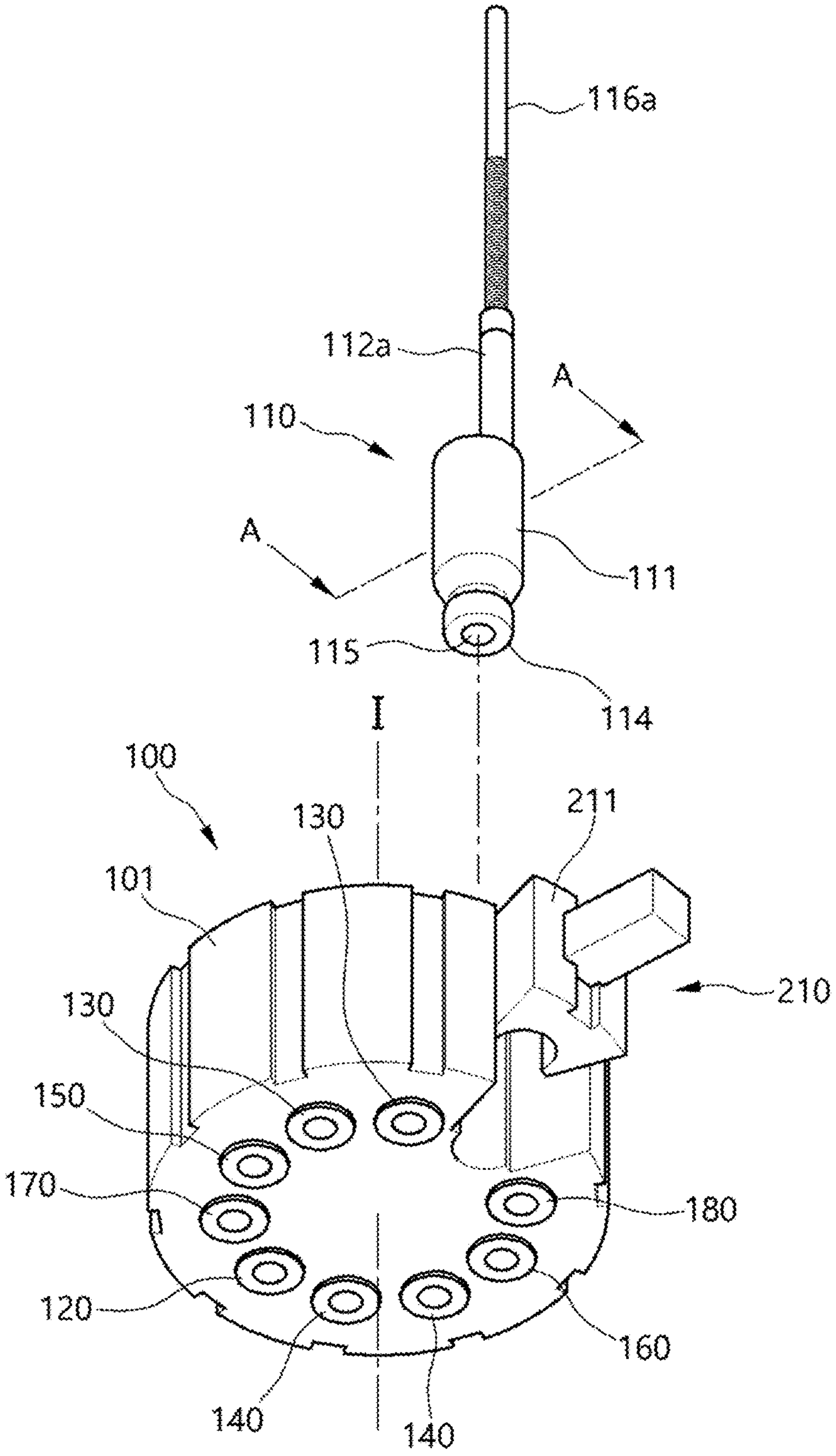
FIG. 2 is a perspective view of the multi-chamber cartridge according to an exemplary embodiment of the present invention.
Figure 3:
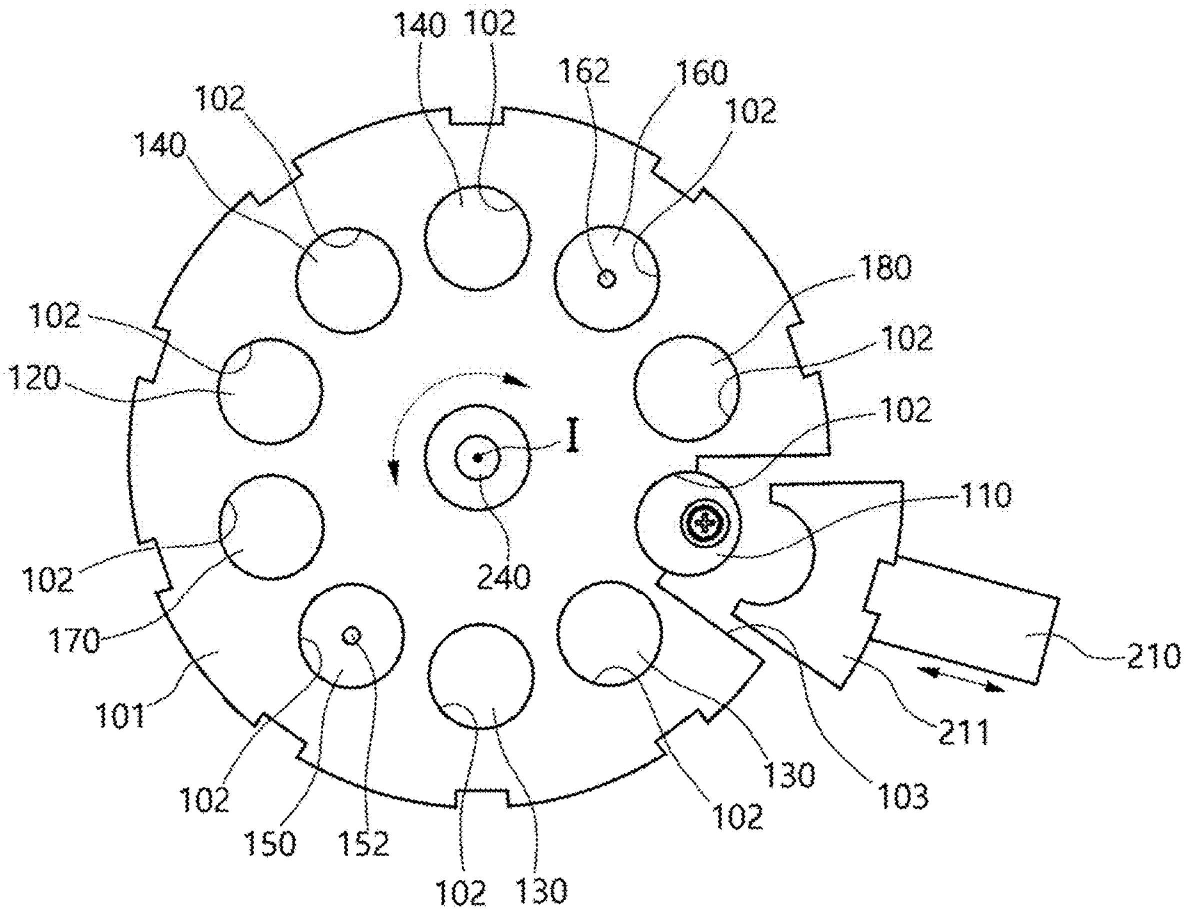
FIG. 3 is a top view of the multi-chamber cartridge according to an exemplary embodiment of the present invention.
Figure 4:
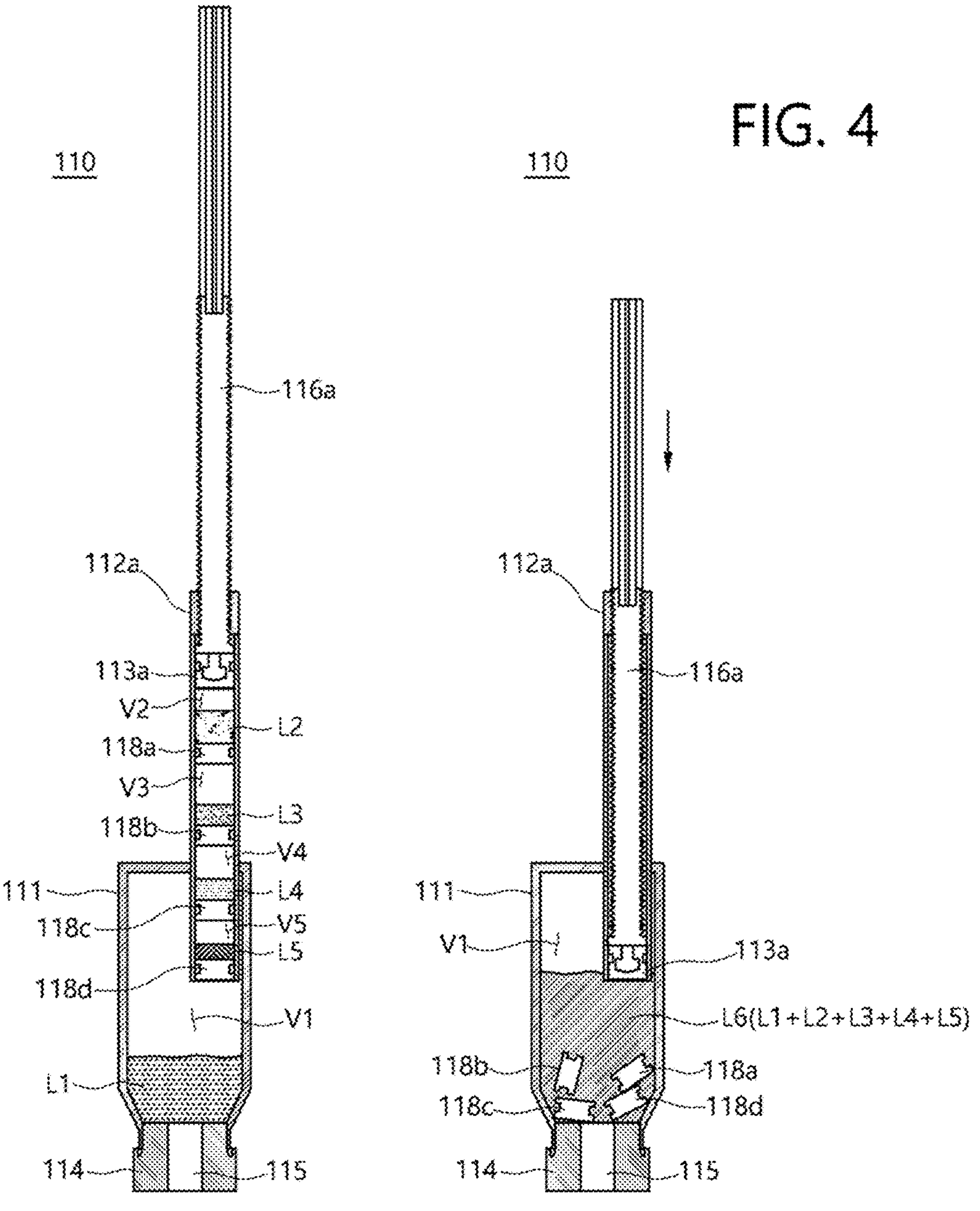
FIG. 4, (a) is a cross-sectional view taken along line A-A in FIG. 2, showing a state before pressing the first plunger, and (b) is a cross-sectional view taken along line A-A in FIG. 2, showing a state after pressing the first plunger.
Figure 5:
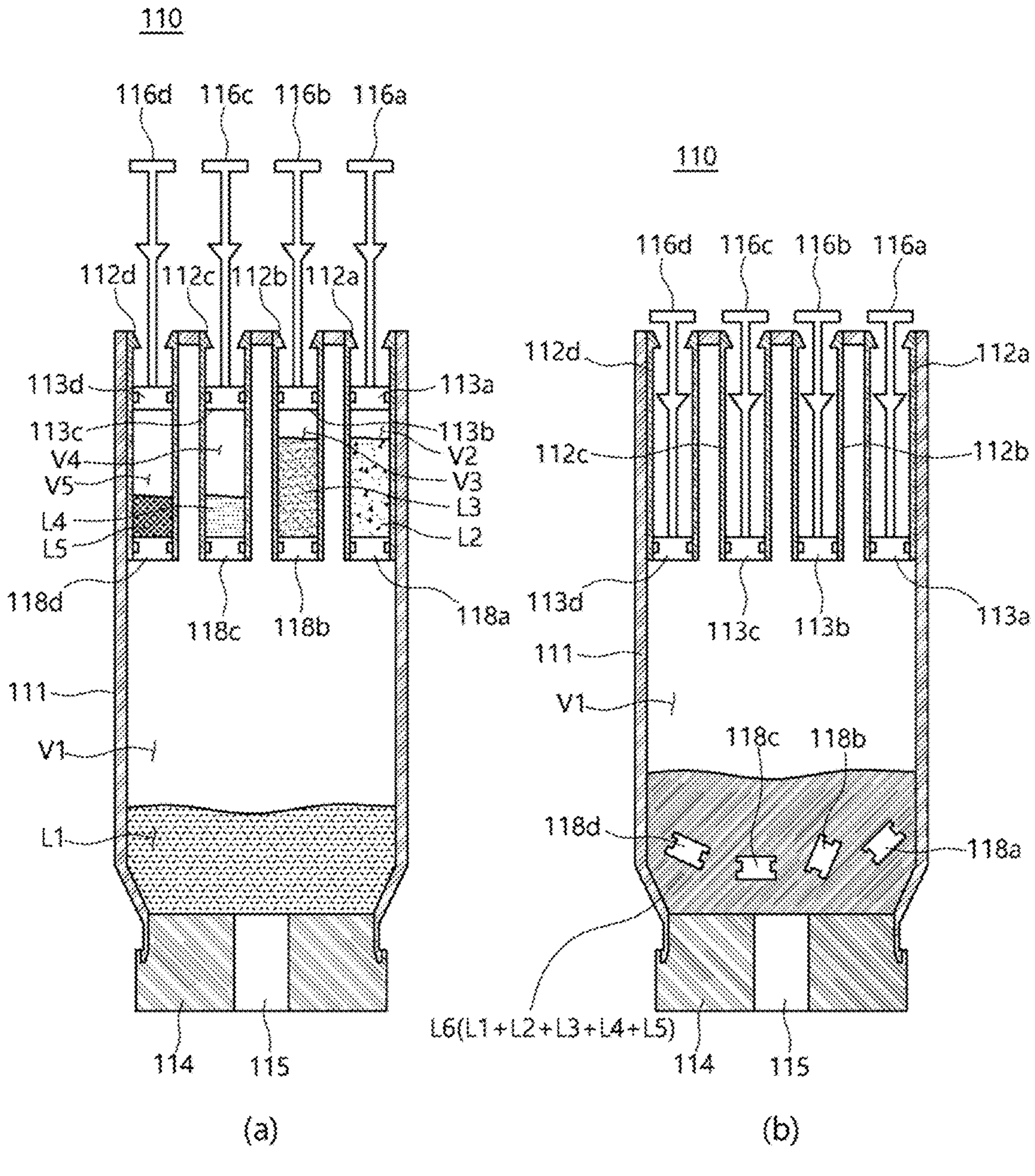
FIG. 5, (a) is a cross-sectional view of a sample chamber of the multi-chamber cartridge according to another exemplary embodiment of the present invention, showing a state before pressing the first to fourth plungers, and (b) is a cross-sectional view of a sample chamber of the multi-chamber cartridge according to another exemplary embodiment of the present invention, showing a state after pressing the first to fourth plungers.

FIG. 1 is a perspective view of the nucleic acid test system provided with a multi-chamber cartridge according to an exemplary embodiment of the present invention. FIG. 2 is a perspective view of the multi-chamber cartridge according to an exemplary embodiment of the present invention. FIG. 3 is a top view of the multi-chamber cartridge according to an exemplary embodiment of the present invention. FIG. 4, (a) is a cross-sectional view taken along line A-A in FIG. 2, showing a state before pressing the first plunger, and FIG. 4, (b) is a cross-sectional view taken along line A-A in FIG. 2, showing a state after pressing the first plunger. FIG. 5, (a) is a cross-sectional view of a sample chamber of the multi-chamber cartridge according to another exemplary embodiment of the present invention, showing a state before pressing the first to fourth plungers, and FIG. 5, (b) is a cross-sectional view of a sample chamber of the multi-chamber cartridge according to another exemplary embodiment of the present invention, showing a state after pressing the first to fourth plungers.

As illustrated in FIG. 1, the multi-chamber cartridge 100 is provided as part of a nucleic acid extraction module 200 and a nucleic acid test system 1. The multi-chamber cartridge 100 accommodates and transports containers such that nucleic acid extraction and nucleic acid detection can be performed automatically.

In this case, as illustrated in FIG. 2, the multi-chamber cartridge 100 according to an exemplary embodiment of the present invention includes a cartridge body 101, a sample chamber 110, a waste sample chamber 120, a washing liquid chamber 130, a waste washing liquid chamber 140, a first drying chamber 150, a second drying chamber 160, an eluate chamber 170 and a storage chamber 180.

As illustrated in FIGS. 2 and 3, the cartridge body 101 is formed in a tubular shape, for example, a cylindrical shape that is easy to rotate. At the center of the cartridge body 101, a rotating shaft member 240 that supports the rotation of the cartridge body 101 and transmits a rotational force to the cartridge body 101 is coupled. Accordingly, the cartridge body 101 is rotated in the longitudinal extension direction of the rotating shaft member 240 as a rotation axis I.

The cartridge body 101 is formed with a plurality of accommodating parts 102 that are formed along the circumference around the rotation axis I of the cartridge body 101. In this case, the sample chamber 110 and the waste sample chamber 120, the washing liquid chamber 130 and the waste washing liquid chamber 140, the first drying chamber 150 and the second drying chamber 160, and the eluent chamber 170 and the storage chamber 180 may be detachably accommodated in each accommodating part 120, respectively.

In this case, in the accommodating part 102, the sample chamber 110 and the waste sample chamber 120, the washing liquid chamber 130 and the waste washing liquid chamber 140, the first drying chamber 150 and the second drying chamber 160, and the eluate chamber 170 and the storage chamber 180 are disposed to face each other with the rotating axis I in the center.

Through this, the sample chamber 110 and the waste sample chamber 120, the washing liquid chamber 130 and the waste washing liquid chamber 140, the first drying chamber 150 and the second drying chamber 160, and the eluent chamber 170 and the storage chamber 180 may be sequentially coupled to an injection needle 251 and a discharge needle 252, which will be described below, while being coupled to the cartridge body 101.

The shape of the accommodating part 102 is not limited, and it may be a shape of a recessed groove or a through-hole. Each of the chambers may be fixed so as not to be separated while being accommodated in the accommodating part 102. In this case, there is no limitation on the method of fixing to the accommodating part 102.

The multi-chamber cartridge 100 may be provided in a state where each chamber is accommodated in the accommodating part 102, and the operator may perform operations of extracting and detecting nucleic acids by coupling only the multi-chamber cartridge 100 to the rotating shaft member 240 of the nucleic acid extraction module 200.

Meanwhile, the sample chamber 110 of the multi-chamber cartridge 100 according to an exemplary embodiment of the present invention includes a sample chamber body 111, a first tube 112*a*, and a first pressure gasket 113*a*, a first separation gasket 118*a* and a first plunger 116*a* for the pretreatment to extract nucleic acids.

The sample chamber body 111 has a mixing space V1 formed therein. The mixing space V1 provides a space in which samples can be mixed and reacted in the pretreatment process. However, as illustrated in FIG. 4, a base sample L1 is placed in the mixing space V1 in a state before the samples to be described below are mixed.

In this case, as illustrated in FIG. 2, the sample chamber body 111 is not limited in shape, as long as it can be formed such that the mixing space V1 is formed therein and can be accommodated in the accommodating part 102 of the cartridge body 101. In the present exemplary embodiment, the sample chamber body 111 is formed as a tubular container extending in the vertical direction.

As illustrated in FIG. 2, the first tube 112*a* is formed to extend in the longitudinal extension direction of the sample chamber body 111. The first tube 112*a* is disposed through the upper side of the sample chamber body 111. The first tube 112*a* and the sample chamber body 111 are integrally formed. That is, the mixing space V1 and the outside are formed not to communicate between the first tube 112*a* and the sample chamber body 111.

As illustrated in FIG. 4, (a), one end of the first tube 112*a* is disposed in the mixing space V1. In this case, depending on the length of the first tube 112*a*, the other end of the first tube 112*a* may be disposed outside the mixing space V1 or may be disposed on top of the mixing space V1.

In this case, the first tube 112*a* is formed in a hollow tubular shape. The shape of the cross-section of the first tube 112*a* is not limited. However, it is preferable to be formed in a circular shape in order to increase the sealing force of the first pressure gasket 113*a* to be described below.

As illustrated in FIG. 4, (a), one end of the first tube 112*a* disposed in the mixing space V1 is spaced apart from the lower end of the mixing space V1. In addition, as a cross-sectional area of the space formed inside the first tube 112*a*, the cross-sectional area which is perpendicular to the extension direction of the first tube 112*a* may be formed to be smaller than the cross-sectional area which is perpendicular to the extension direction of the first tube 112*a* in the mixing space V1. Accordingly, the first separation gasket 118*a*, which will be described below, may be separated from one end of the first tube 112*a* to the lower side and move to the mixing space V1.

As illustrated in FIG. 4, (a), the first pressure gasket 113*a* is coupled to the inside of the first tube 112*a*. The first pressure gasket 113*a* is a plate-shaped member that is formed in the same shape as the cross-section which is perpendicular to the longitudinal direction of the first tube 112*a*.

The first pressure gasket 113*a* divides the inner space of the first tube 112*a* and serves to seal the divided space. In this case, the first pressure gasket 113*a* is formed of a material having elasticity such that the gap between the inner peripheral surface of the first tube 112*a* and the outer peripheral surface of the first pressure gasket 113*a* can be sealed. For example, the first pressure gasket 113*a* may be formed of rubber.

The first pressure gasket 113*a* is coupled to the inside of the first tube 112*a* and may move along the inner peripheral surface of the first tube 112*a*. That is, as the first pressure gasket 113*a* moves, the size and position of the space divided by the first pressure gasket 113*a* may move together.

In this case, as illustrated in FIG. 4, a first separation gasket 118*a* is disposed on the lower surface as one surface of the first pressure gasket 113*a*. The first separation gasket 118*a* also divides the inner space of the first tube 112*a* and serves to seal the divided space. In addition, it is coupled to the inner side of the first tube 112*a* and may move along the inner peripheral surface of the first tube 112*a*. The description of the shape and material of the first separation gasket 118*a* therefor is replaced with the description of the first pressure gasket 113*a*.

In this case, as illustrated in FIG. 4, the first separation gasket 118*a* is disposed to be spaced apart from the first pressure gasket 113*a*. Accordingly, a sealed space is formed by the inner surface of the first tube 112*a*, the upper surface as one surface of the first separation gasket 118*a*, and the lower surface as one surface of the first pressure gasket 113*a*. In this case, the formed space is defined as a first sample space V2. A first sample L2 is placed in the first sample space V2.

In this case, as illustrated in FIG. 4, (a), in order to control the movement of the first pressure gasket 113*a* and the first separation gasket 118*a*, a first plunger 116*a* is coupled to the upper surface as the other surface of the first pressure gasket 113*a*.

As illustrated in FIG. 2, the first plunger 116*a* is formed in the shape of a bar extending in length. As illustrated in FIG. 4, (b), the first plunger 116*a* is disposed inside the first tube 112*a* to be extended in length so as to move the first pressure gasket 113*a* to the lower end of the first tube 112*a*. In this case, the length to which the first plunger 116*a* extends may vary depending on the design.

When the first pressure gasket 113*a* is pressed downward through the first plunger 116*a*, the first sample space V2 which is sealed together with the first pressure gasket 113*a* and the first separation gasket 118*a* is moved to the lower side.

When the first plunger 116*a* moves to the lower end of the first tube 112*a*, the first separation gasket 118*a* is separated from the first tube 112*a* and moves to the mixing space V1. Accordingly, the first sample space V2 is combined with the mixing space V1, and the first sample L2 which is disposed in the first sample space V2 is mixed with the base sample LL.

Figure 8:
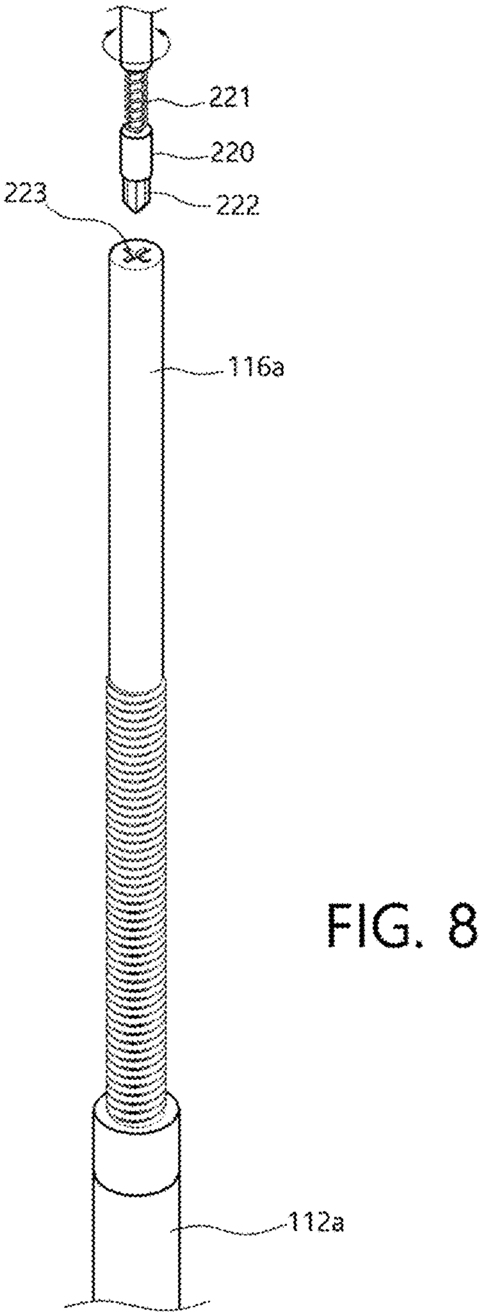
FIG. 8 is a view illustrating a pressing member of the nucleic acid extraction module provided with a multi-chamber cartridge according to an exemplary embodiment of the present invention.
Figure 9:
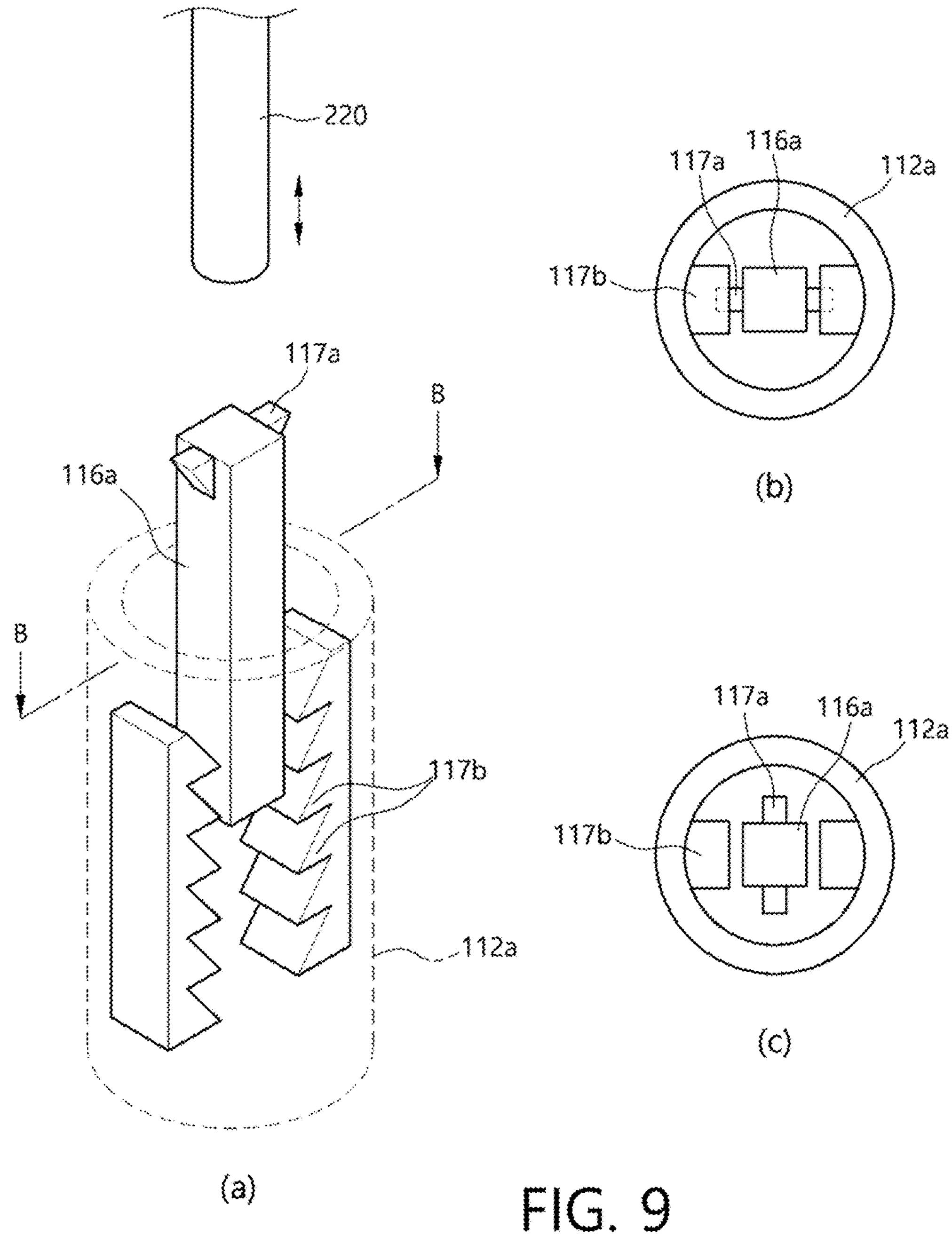
FIG. 9, (a) is a view illustrating a pressing member of the nucleic acid extraction module provided with a multi-chamber cartridge according to a modified example of an exemplary embodiment of the present invention, (b) is a cross-sectional view illustrating the cross-section along line B-B of (a), illustrating a state in which the first locking protrusion and the second locking protrusion are arranged side by side, and (c) is a view illustrating a state in which the first locking protrusion and the second locking protrusion are disposed to be misaligned.

FIG. 8 is a view illustrating a pressing member of the nucleic acid extraction module provided with a multi-chamber cartridge according to an exemplary embodiment of the present invention. FIG. 9, (a) is a view illustrating a pressing member of the nucleic acid extraction module provided with a multi-chamber cartridge according to a modified example of an exemplary embodiment of the present invention, FIG. 9, (b) is a cross-sectional view illustrating the cross-section along line B-B of FIG. 9, (a), illustrating a state in which the first locking protrusion and the second locking protrusion are arranged side by side, and FIG. 9, (c) is a view illustrating a state in which the first locking protrusion and the second locking protrusion are disposed to be misaligned.

The first plunger 116*a* may move along the inside of the first tube 112*a* in various ways. In this case, since it is determined whether the first sample L2 and the base sample L1 can be mixed according to the moving distance of the first plunger 116*a*, it is important to stably move the first plunger 116*a*. In particular, since the first plunger 116*a* needs to be moved only downward when the first sample L2 is moved, it is necessary to prevent the first plunger 116*a* from moving upward due to internal pressure of the sample chamber body 111 during the movement process.

To this end, as illustrated in FIG. 8, the first plunger 116*a* of the multi-chamber cartridge 100 according to an exemplary embodiment of the present invention may be formed to be screw-coupled with one side of the inner peripheral surface of the first tube 112*a*. Accordingly, by rotating the first plunger 116*a* in one direction, the first pressure gasket 113*a* may be gradually moved downward. In addition, by rotating the first plunger 116*a* in the other direction, the first pressure gasket 113*a* may be moved upward to secure the first sample space V2 in the initial state.

In this case, the position where the first plunger 116*a* and the first tube 112*a* are screw-coupled is the upper end of the first tube 112*a*. Through this, it is possible to prevent the first pressure gasket 113*a* from escaping upward from the first tube 112*a* while guaranteeing the downward movement of the first pressure gasket 113*a*.

On the other hand, as illustrated in FIG. 9, (a), the sample chamber 110 of the multi-chamber cartridge 100 according to a modified example of an exemplary embodiment of the present invention may further include a locking part 117 for the movement of the first plunger 116*a*. The locking part 117 limits the moving direction of the first plunger 116*a* such that the first plunger 116*a* can move only in a direction toward the mixing space V1. To this end, the locking part 117 includes a first locking protrusion 117*a* and a second locking protrusion 117*b*.

As illustrated in FIG. 9, (a), the first locking protrusion 117*a* is formed on one side of the outer peripheral surface of the first plunger 116*a*. The first locking protrusion 117*a* has an inclined surface formed toward the mixing space V1 and a locking surface formed in a direction opposite to the direction toward the mixing space V1, that is, toward the lower side.

When this is described more specifically, as illustrated in FIG. 9, (a), the inclined surface of the first locking protrusion 117*a* is formed to form an acute angle with the axis extending upward, and the locking surface is formed to form a right angle with the axis extending upward.

On the other hand, the second locking protrusion 117*b* has an inclined surface formed on one side of the inner peripheral surface of the first tube 112*a* in a direction opposite to the direction toward the mixing space V1, that is, upward, and protrudes such that a locking surface is formed toward the mixing space V1.

When this is described more specifically, as illustrated in FIG. 9, (a), the inclined surface of the second locking protrusion 117*b* is formed to form an obtuse angle with the axis extending upward, and the locking surface is formed to form a right angle with the axis extending upward.

In this case, a plurality of second locking protrusions 117*b* are formed along the longitudinal direction of the first tube 112*a*. The number of the plurality of second locking protrusions 117*b* is formed to correspond to the length to which the first plunger 116*a* must move.

As illustrated in FIG. 9, (a), the second locking protrusion 117*b* is formed on the upper end of the first tube 112*a*, and the first locking protrusion 117*a* corresponds thereto such that while the first locking protrusion 117*a* is fit-coupled between the two second locking protrusions 117*b* that are located at the bottom of the plurality of second locking protrusions 117*b*, the first pressure gasket 113*a* is disposed at the upper end of the first plunger 116*a* so as to be disposed at the lower end of the first tube 112*a*.

As the first locking protrusion 117*a* presses the first plunger 116*a* downward, the inclined surface of the first locking protrusion 117*a* and the inclined surface of the first second locking protrusion 117*b* come into contact with each other from the upper side. In this case, the first locking protrusion 117*a* and the second locking protrusion 117*b* may elastically deform in a mutually pushing direction. Accordingly, the first locking protrusion 117*a* is guided by the inclined surface of the first locking protrusion 117*a* and the inclined surface of the second locking protrusion 117*b* to move from the upper side to the second locking protrusion 117*b*.

In this case, even if the first plunger 116*a* is pulled upward, the locking surface of the first locking protrusion 117*a* and the locking surface of the second locking protrusion 117*b* come into contact with each other, and since elastic deformation is not performed due to the characteristics of the shape, the first plunger 116*a* cannot move upward.

That is, as illustrated in FIG. 9, (b), while the first locking protrusion 117*a* and the second locking protrusion 117*b* are disposed in the same direction, the first plunger 116*a* can only move downward, and upward movement is restricted.

On the other hand, as illustrated in FIG. 9, (c), while the first locking protrusion 117*a* and the second locking protrusion 117*b* are disposed to be misaligned, the locking surfaces of the first locking protrusion 117*a* and the second locking protrusion 117*b* cannot come into contact with each other, and the first plunger 116*a* can be easily moved upward. Through this, the first plunger 116*a* may be disposed at an initial position, and the first sample space V2 may be secured.

As illustrated in FIG. 9, (b), the first locking protrusion 117*a* may be formed as a pair on the outer peripheral surface of the first plunger 116*a*. The pair of the first locking protrusions 117*a* may be disposed to face each other with the first plunger 116*a* in the middle. In addition, the second locking protrusions 117*b* may be formed in a plurality of pairs corresponding to the positions of the pair of first locking protrusions 117*a*.

In this case, the first plunger 116*a* can be moved upward by rotating 90 degrees about an axis extending in the longitudinal direction such that the first locking protrusion 117*a* and the second locking protrusion 117*b* are misaligned.

Meanwhile, as illustrated in FIG. 4, (a), the multi-chamber cartridge 100 according to an exemplary embodiment of the present invention may further include a second separation gasket 118*b*, a third separation gasket 118*c* and a fourth separation gasket 118*d*.

The second separation gasket 118*b*, the third separation gasket 118*c* and the fourth separation gasket 118*d* are closely coupled to the inside of the first tube 112*a* similar to the first separation gasket 118*a*, and are formed to be movable along the inner peripheral surface of the first tube 112*a*. The descriptions of the shapes and materials of the second separation gasket 118*b*, the third separation gasket 118*c* and the fourth separation gasket 118*d* are replaced with the description of the first separation gasket 118*a*.

The second separation gasket 118*b*, the third separation gasket 118*c* and the fourth separation gasket 118*d* are arranged in order from above, as illustrated in FIG. 4, (a). That is, the first pressure gasket 113*a*, the first separation gasket 118*a*, the second separation gasket 118*b*, the third separation gasket 118*c* and the fourth separation gasket 118*d* may be coupled in order inside the first tube 112*a*.

Accordingly, similar to the first sample space V2 between the first pressure gasket 113*a* and the first separation gasket 118*a*, a second sample space V3, a third sample space V4 and a fourth sample space V5 may be formed between the first separation gasket 118*a*, the second separation gasket 118*b*, the third separation gasket 118*c* and the fourth separation gasket 118*d*, respectively. The description of each space is replaced with the description of the first sample space V2 described above.

In this case, the second sample L3, the third sample L4 and the fourth sample L5 are placed in the second sample space V3, the third sample space V4, and the fourth sample space V5, respectively. That is, as illustrated in FIG. 4, (b), as the first plunger 116*a* moves downward, the fourth separation gasket 118*d*, the third separation gasket 118*c*, the second separation gasket 118*b* and the first separation gasket 118*a* are separated from the first tube 112*a* and moved to the mixing space V1, and the fourth sample L5, the third sample L4, the second sample L3 and the first sample L2 are sequentially moved to the mixing space V1 to be mixed.

In this case, by controlling the movement of the first plunger 1*i*6*a* through the pressing member 220 to be described below, it is possible to control the next sample to be mixed after the samples to be mixed in each step are sufficiently mixed and reacted.

Meanwhile, as illustrated in FIG. 5, (a) and (b), the multi-chamber cartridge 100 according to another exemplary embodiment of the present invention may further include a second tube 112*b*, a second plunger 116*b*, a third tube 112*c*, a third plunger 116*c*, a fourth tube 112*d* and a fourth plunger 116*d*.

The first tube 112*a* of the sample chamber 110 of the multi-chamber cartridge 100 according to another exemplary embodiment of the present invention is formed to be shorter than the first tube 112*a* in an exemplary embodiment of the present invention. This is because, in another exemplary embodiment of the present invention, only the first sample space V2 needs to be formed in the first tube 112*a*.

However, in order to mix the second sample L3, the third sample L4 and the fourth sample L5, the second tube 112*b*, the third tube 112*c* and the fourth tube 112*d* that are formed identically to the first tube 112*a* are arranged side by side.

In this case, the second pressure gasket 113*b* and the second separation gasket 118*b* are coupled to the second tube 112*b*, and a second sample space V3 is formed between the second pressure gasket 113*b* and the second separation gasket 118*b*. In addition, the second sample L3 is placed in the second sample space V3. A second plunger 116*b* is coupled to the second pressure gasket 113*b* to control the movement of the second pressure gasket 113*b*.

Similarly, the third pressure gasket 113*c* and the third separation gasket 118*c* are coupled to the third tube 112*c*, and a third sample space V4 is formed between the third pressure gasket 113*c* and the third separation gasket 118*c*. In addition, a third sample L4 is placed in the third sample space V4. A third plunger 116*c* is coupled to the third pressure gasket 113*c* to control the movement of the third pressure gasket 113*c*.

In addition, the fourth pressure gasket 113*d* and the fourth separation gasket 118*d* are coupled to the fourth tube 112*d*, and a fourth sample space V5 is formed between the fourth pressure gasket 113*d* and the fourth separation gasket 118*d*. In addition, a fourth sample L5 is placed in the fourth sample space V5. A fourth plunger 116*d* is coupled to the fourth pressure gasket 113*d* to control the movement of the fourth pressure gasket 113*d*.

In this case, as illustrated in FIG. 5, (b), by pressing the first plunger 116*a*, the second plunger 116*b*, the third plunger 116*c* and the fourth plunger 116*d* in reverse order through a pressing member 220 to be described below, the fourth sample L5, the third sample L4, the second sample L3 and the first sample L2 may be sequentially moved and reacted in the mixing space V1.

In this case, in another exemplary embodiment of the present invention, the pressing member 220 may be provided in plurality to individually press the first plunger 116*a*, the second plunger 116*b*, the third plunger 116*c* and the fourth plunger 116*d*.

Figure 6:
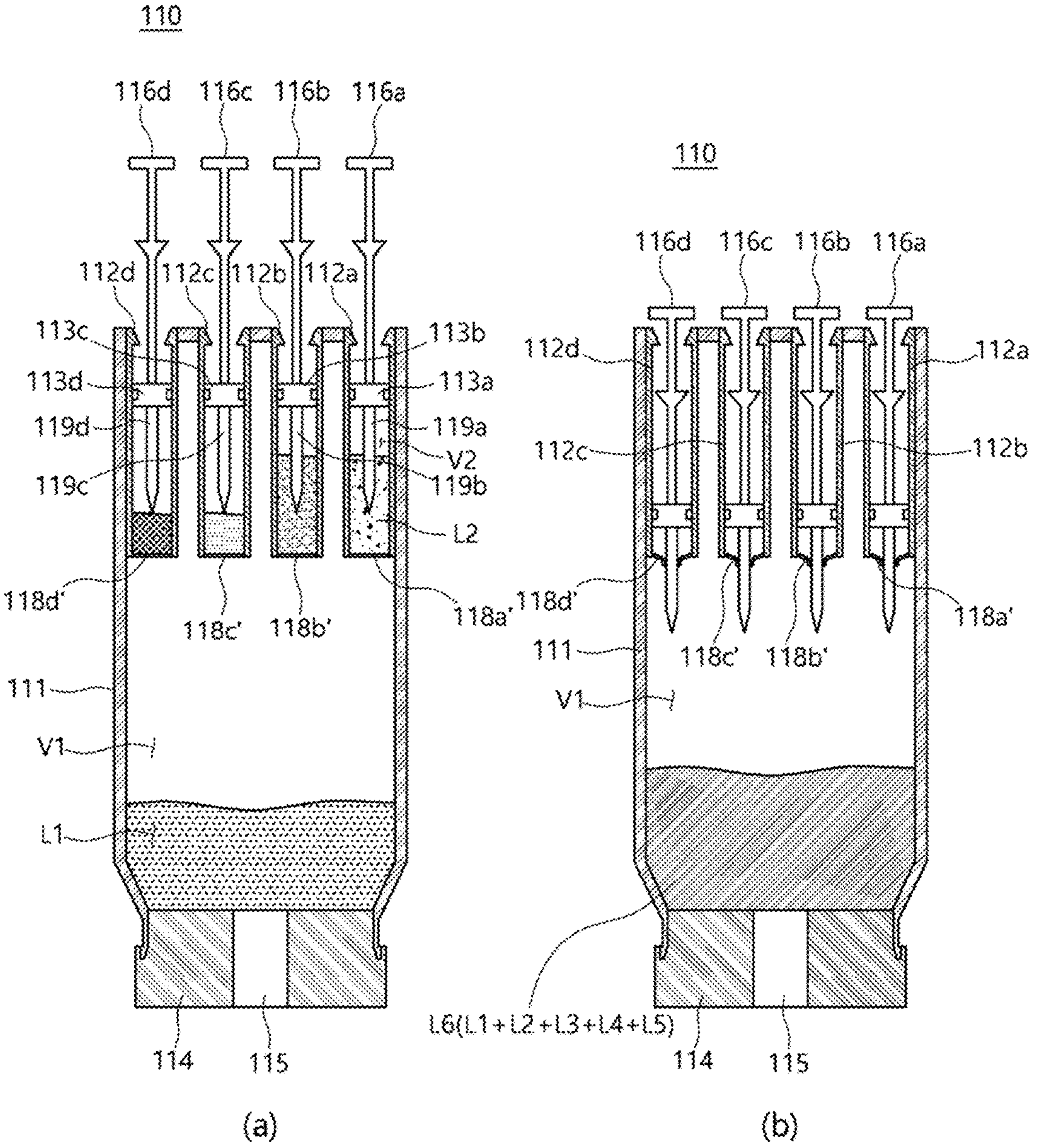
FIG. 6, (a) is a cross-sectional view of a sample chamber of the multi-chamber cartridge according to still another exemplary embodiment of the present invention, showing a state before pressing the first to fourth plungers, and (b) is a cross-sectional view of a sample chamber of the multi-chamber cartridge according to another exemplary embodiment of the present invention, a showing a state after pressing the first to fourth plungers.

FIG. 6, (a) is a cross-sectional view of a sample chamber of the multi-chamber cartridge according to still another exemplary embodiment of the present invention, showing a state before pressing the first to fourth plungers, and FIG. 6, (b) is a cross-sectional view of a sample chamber of the multi-chamber cartridge according to another exemplary embodiment of the present invention, a showing a state after pressing the first to fourth plungers.

Meanwhile, as illustrated in FIG. 6, (a) and (b), similar to other exemplary embodiments of the present invention, the sample chamber 110 of the multi-chamber cartridge 100 according to another exemplary embodiment of the present invention includes a first tube 112*a*, a second tube 112*b*, a third tube 112*c*, a fourth tube 112*d*, a first plunger 116*a*, a second plunger 116*b*, a third plunger 116*c*, a fourth plunger 116*d*, a first pressure gasket 113*a*, a second pressure gasket 113*b*, a third pressure gasket 113*c* and a fourth pressure gasket 113*d*, but it includes a first separation gasket 118*a*', a second separation gasket 118*b*', a third separation gasket 118*c*' and a fourth separation gasket 118*d*' that are different from other exemplary embodiments of the present invention, and it further includes a first drilling member 119*a*, a second drilling member 119*b*, a third drilling member 119*c* and a fourth drilling member 119*d*.

As illustrated in FIG. 6, (a), the first separation gasket 118*a*', the second separation gasket 118*b*', the third separation gasket 118*c*' and the fourth separation gasket 118*d*' are respectively fixed to the inner peripheral surfaces at the lower end portions of the first tube 112*a*, the second tube 112*b*, the third tube 112*c* and the fourth tube 112*d*. That is, the first separation gasket 118*a*', the second separation gasket 118*b*', the third separation gasket 118*c*' and the fourth separation gasket 118*d*' do not respectively move along the inner peripheral surfaces of the first tube 112*a*, the second tube 112*b*, the third tube 112*c* and the fourth tube 112*d*.

In this case, the first separation gasket 118*a*', the second separation gasket 118*b*', the third separation gasket 118*c*' and the fourth separation gasket 118*d*' respectively form a first sample space V2, a second sample space V3, a third sample space V4 and a fourth sample space V5 that are defined by the first pressure gasket 113*a*, the second pressurization gasket 113*a*, the third pressure gasket 113*c*, the fourth pressure gasket 113*d*, and the inner peripheral surfaces of the first tube 112*a*, the second tube 112*b*, the third tube 112*c* and the fourth tube 112*d*

As illustrated in FIG. 6, (a), the first drilling member 119*a*, the second drilling member 119*b*, the third drilling member 119*c* and the fourth drilling member 119*d* respectively protrude on a surface toward the lower side as one surface of the first pressure gasket 113*a*, the second pressure gasket 113*b*, the third pressure gasket 113*c* and the fourth pressure gasket 113*d*. In this case, the descriptions of the second drilling member 119*b*, the third drilling member 119*c* and the fourth drilling member 119*d* are replaced with the description of the first drilling member 119*a*.

As illustrated in FIG. 6, (a), the first drilling member 119*a* is formed such that the cross-sectional area which is perpendicular to the protruding direction decreases toward the first separation gasket 118*a*'. That is, the lower front end of the first drilling member 119*a* is formed to be sharp.

As illustrated in FIG. 6, (b), as the first plunger 116*a* is pressed downward, the first drilling member 119*a* moves downward together with the first pressing gasket 113*a*. In this case, as illustrated in FIG. 8, (b), when the front end of the first drilling member 119*a* reaches the first separation gasket 118*a*', the first drilling member 119*a* breaks the first separation gasket 118*a*'. Accordingly, the first sample L2 is moved to the mixing space V1 through the broken first separation gasket 118*a*' and is mixed with the base sample L1.

Figure 7:
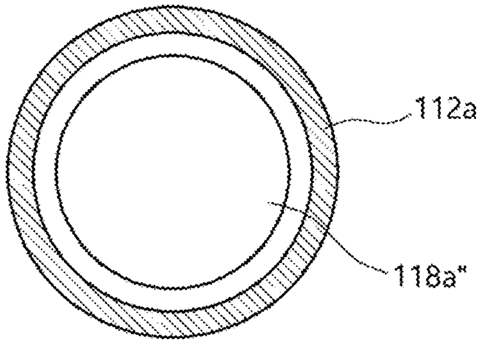
FIG. 7, (a) is a top view of a first separation gasket of a sample chamber of the multi-chamber cartridge according to a modified example of still another exemplary embodiment of the present invention, and (b) is a cross-sectional view of a first separation gasket of a sample chamber of the multi-chamber cartridge according to a modified example of another exemplary embodiment of the present invention.
Figure 7:
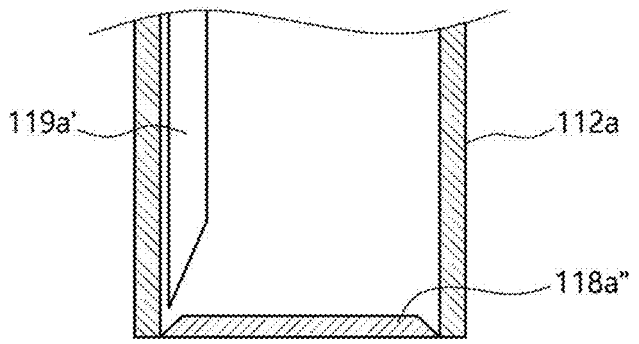

FIG. 7, (a) is a top view of a first separation gasket of a sample chamber of the multi-chamber cartridge according to a modified example of still another exemplary embodiment of the present invention, and FIG. 7, (b) is a cross-sectional view of a first separation gasket of a sample chamber of the multi-chamber cartridge according to a modified example of another exemplary embodiment of the present invention.

Meanwhile, as illustrated in FIGS. 7 (*a*) and (*b*), the first separation gasket 118*a*" of the sample chamber 110 of the multi-chamber cartridge 100 according to another exemplary embodiment of the present invention is formed such that the edge portion is thinner than the central portion. Accordingly, when the first separation gasket 118*a*" is broken through the first drilling member 119*a*', the thin edge portion of the first separation gasket 118*a*" begins to be broken first.

In this case, the first tube 112*a* and the first separation gasket 118*a*" may be integrally formed. Accordingly, the first separation gasket 118*a*" may be easily formed to the first tube 112*a* without a separate coupling operation.

As illustrated in FIG. 7, (b), the first drilling member 119*a*' may be formed to be broken from the edge portion of the first separation gasket 118*a*". When this is described more specifically, the first drilling member 119*a*' is formed with a pointed lower end, and the pointed lower end may be formed to face the edge portion of the first separation gasket 118*a*". That is, the first drilling member 119*a*' may be formed in the shape of a cylinder that is cut diagonally.

Accordingly, the thin edge portion of the first separation gasket 118*a*" is intensively pressed to separate the edge portion of the first separation gasket 118*a*" from the inner peripheral surface of the first tube 112*a*, and the first sample L2 can smoothly move to the mixing space V1.

As described above, another exemplary embodiment or still another exemplary embodiment of the present invention have only some differences in the method of moving the sample and arranging a plurality of tubes and plungers, and thus, hereinafter, by focusing on the multi-chamber cartridge 100 according to an exemplary embodiment of the present invention, the nucleic acid extraction module 200 including the same will be described.

The nucleic acid test system 1 provided with a multi-chamber cartridge 100 according to an exemplary embodiment of the present invention includes the above-described multi-chamber cartridge 100, nucleic acid extraction module 200 and nucleic acid test module 300. In this case, the nucleic acid extraction module 200 includes a first heater 210, a pressing member 220 and a first driving unit 230.

As illustrated in FIGS. 2 and 3, an opening 103 is formed at an end portion on the side where the same chamber 110 of the cartridge body 101 of the multi-chamber cartridge 100 is disposed. The opening 103 is formed to expose one side of the sample chamber body 111 of the sample chamber 110 to the outside.

In this case, the opening 103 provides a space into which the first heater 210 to be described below can be inserted. Accordingly, the shape of the opening 103 is not limited as long as it can be formed to correspond to the shape of the first heater 210. In the present exemplary embodiment, the arc-side end of a fan-shaped part that is formed in a direction of the sample chamber 110 around the rotation axis I is removed to form the opening 103.

In this case, as illustrated in FIGS. 1 and 2, the first heater 210 is formed in a shape corresponding to the shape of the opening 103. The first heater 210 heats one side of the sample chamber 110 that is exposed to the outside through the opening 103. Through this, it serves to promote the reaction of the mixed samples in the mixing space V1 of the sample chamber 110.

In this case, as illustrated in FIG. 3, the first heater 210 includes a heating unit 211 that can move toward the sample chamber 110 to more effectively heat the sample chamber 110. When the sample chamber 110 is rotated by the first driving unit 230 to be described below and reaches the side of the first heater 210, the heating unit 211 moves toward the sample chamber 110 and covers or contacts the outer surface of the sample chamber 110. That is, the heating unit 211 is disposed adjacent to one side of the sample chamber 110 in order to heat the sample chamber 110 and reciprocates to be spaced apart from the sample chamber 110 when the heating is finished.

As illustrated in FIG. 3, the heating unit 211 is formed in a shape corresponding to the outer surface of the sample chamber 110 in order to efficiently heat the sample chamber 110. That is, since the outer surface of the sample chamber 110 is formed as a part of the tubular shape, the heating unit 211 may be formed in a recessed shape to be seated on the outer surface of the tubular shape.

The heating unit 211 may control time and temperature. Therefore, it is possible to provide an optimized time and temperature environment to promote the reaction according to the type of mixed sample. In particular, by controlling the pressing member 220 to be described below, the fourth sample L5, the third sample L4, the second sample L3 and the first sample L2 may be heated to different temperatures at each step of inputting the mixture thereof into the basic sample LL.

Meanwhile, the heating unit 211 may intensively heat the lower end of the sample chamber 110. Accordingly, the sample that is located on the lower side is heated through the convection effect, thereby generating a circulation in which the upper side moves such that the reaction between the samples can be further promoted.

The pressing member 220 presses the upper end of the first plunger 116*a* to move the first plunger 116*a* downward. In this case, when the first plunger 116*a* can be moved downward along the inner surface of the first tube 112*a* by pressing the first plunger 116*a*, there is no limitation on the structure in which the pressing member 220 presses.

For example, as illustrated in FIG. 8, in the sample chamber 110 of the multi-chamber cartridge 100 according to an exemplary embodiment of the present invention, a rotation driving force is provided to the first plunger 116*a* such that the first plunger 116*a* rotates in one direction or the other direction in a structure in which the first plunger 116*a* is screw-coupled together with the first tube 112*a*.

To this end, the pressing member 220 of the nucleic acid extraction module 200 provided with the multi-chamber cartridge 100 according to an exemplary embodiment of the present invention includes a coupling protrusion 222 and a spring member 221.

As illustrated in FIG. 8, the pressing member 220 is movable in the vertical direction, receives a driving force in the rotational direction, and transmits the same to the first plunger 116*a*.

In this case, the rotational movement of the pressing member 220 in the rotational direction is limited in order to receive a driving force in the rotational direction. However, it is not constrained in the vertical direction. Through this, when the multi-chamber cartridge 100 is coupled to the pressing member 220, the user can easily place the multi-chamber cartridge 100 while the pressing member 220 is lifted up, and lower the pressing member 220 to fix to the first plunger 116*a*.

In this case, as illustrated in FIG. 8, a coupling groove 223 is formed in the first plunger 116*a*. A coupling protrusion 222 protruding from the pressing member 220 is coupled to the coupling groove 223. In this case, the coupling protrusion 222 and the coupling groove 223 are formed to correspond to each other such that the first plunger 116*a* can be rotated according to the rotation of the coupling protrusion 222. For example, the coupling protrusion 222 may protrude in a cross shape, and the coupling groove 223 may be recessed in a cross shape.

In this case, as illustrated in FIG. 8, a spring member 221 is installed on the pressing member 220. The spring member 221 provides an elastic force to press the coupling protrusion 222 in the insertion direction of the coupling protrusion 222, in order to maintain a state in which the coupling protrusion 222 is inserted into the coupling groove 223.

The spring member 221 may be spirally disposed along the outer surface of the pressing member 220. However, as long as the spring member 221 can provide a force for pressing the pressing member 220 downward, there is no limitation on the structure or position in which it is installed.

Meanwhile, as illustrated in FIG. 9, in the case of the sample chamber 110 of the multi-chamber cartridge 100 according to a modified example of an exemplary embodiment of the present invention, the pressing member 220 is directed downward rather than a rotational driving force to provide a simple pressing force. In this case, there is no limitation on the method in which the pressing member 220 presses the first plunger 116*a*, and various known methods may be used.

The reason why the basic sample L1, the first sample L2, the second sample L3, the third sample L4 and the fourth sample L5 are separately stored through the sample chamber 110 is to fully demonstrate the efficacy of each sample. When this is described more specifically, in order to extract nucleic acids from blood, which is the basic sample L1, a solution is required that provides an environment for activating enzymes and their functions.

That is, the first sample L2, the second sample L3, the third sample L4 and the fourth sample L5 may be enzymes that have functions to cut specific proteins or molecules, such as DNase and Proteinase K, for the pretreatment of nucleic acids, surfactant-based solutions that dissolve the walls of viruses or bacteria, solutions including a high concentration of salt (lysis buffers) and the like. In this case, if the above-mentioned enzymes and solutions are present by being mixed, they should be stored separately because there may be problems with maintaining the structure and activity of a specific enzyme.

Therefore, by providing the sample chamber 110 of the multi-chamber cartridge 100 according to an exemplary embodiment of the present invention, it is possible to increase the extraction rate of nucleic acids by separately storing each sample and mixing the same at each reaction step.

Figure 10:
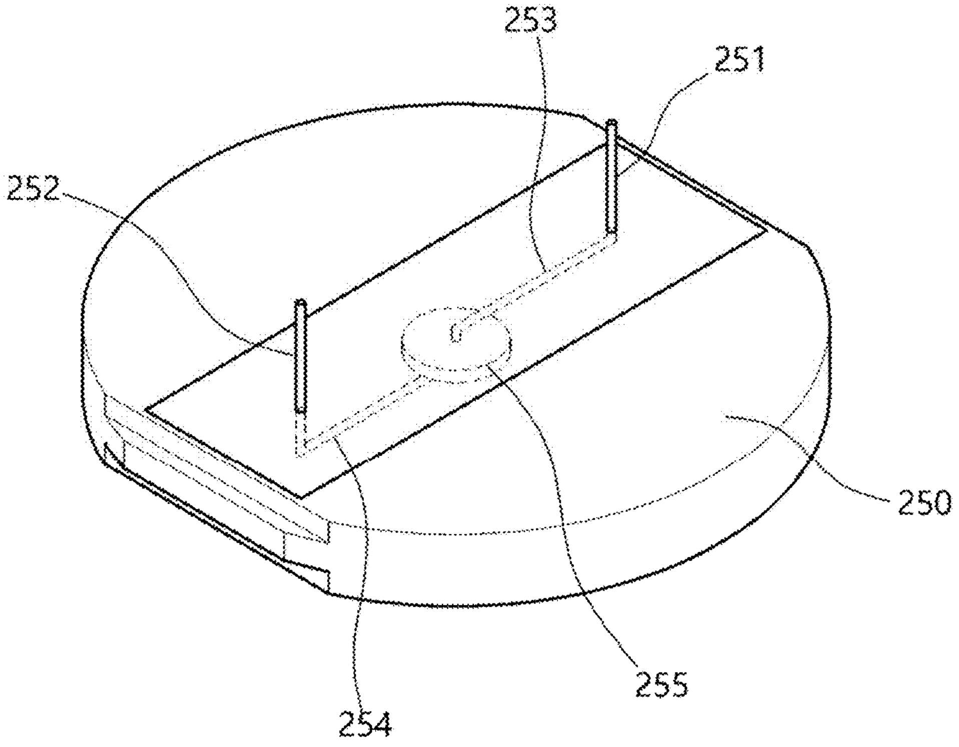
FIG. 10 is a perspective view of an extraction base of the nucleic acid test system provided with a multi-chamber cartridge according to an exemplary embodiment of the present invention.
Figure 11:
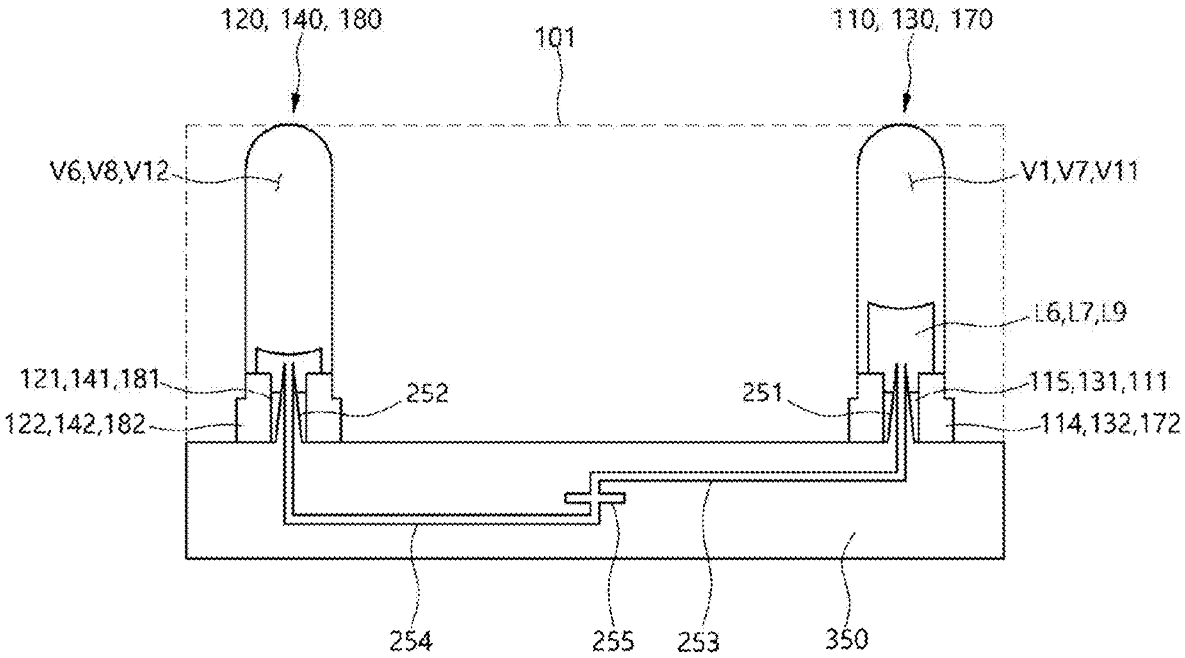
FIG. 11 is a cross-sectional view of an extraction base and a multi-chamber cartridge of the nucleic acid test system provided with a multi-chamber cartridge according to an exemplary embodiment of the present invention.
Figure 12:
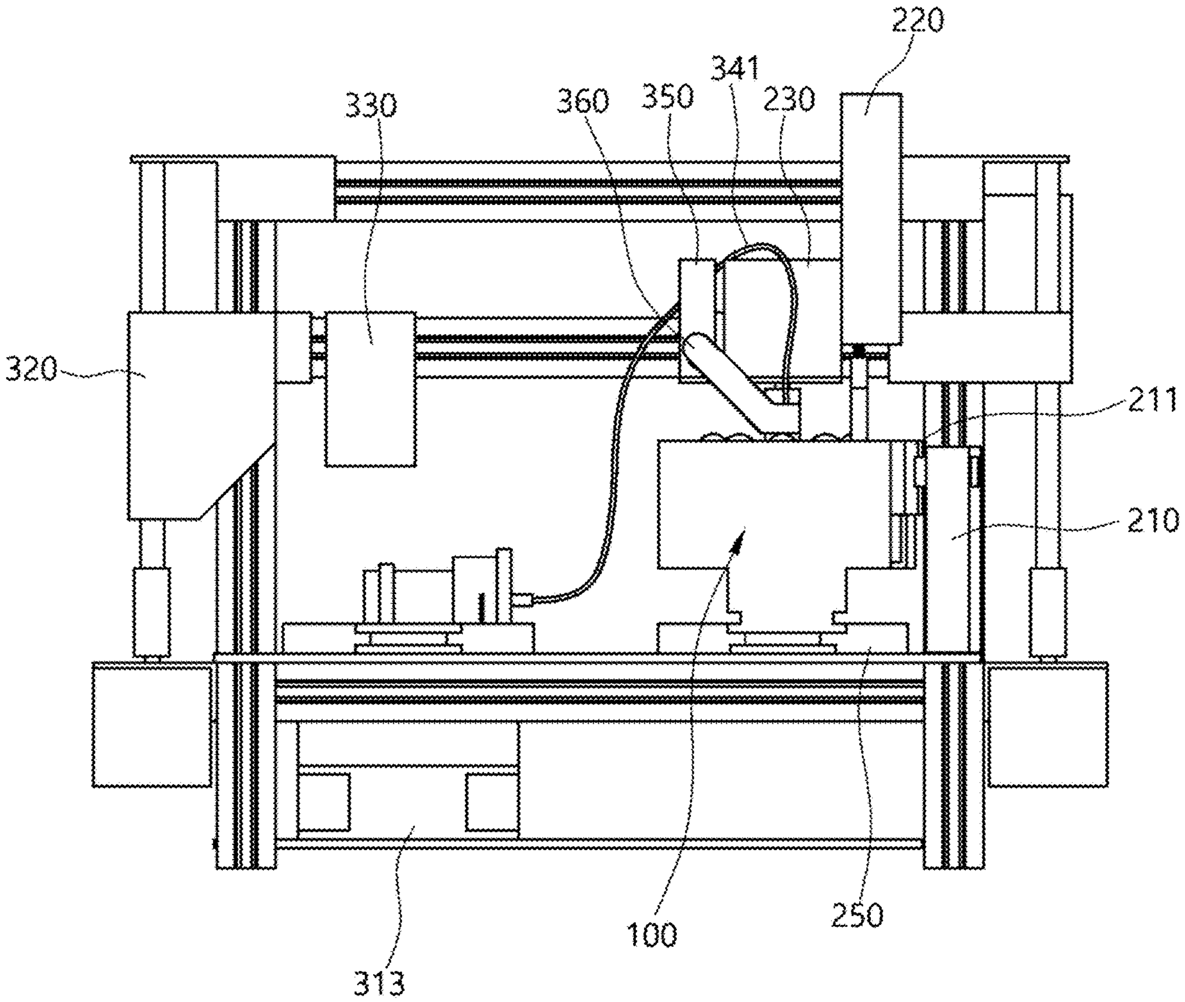
FIG. 12 is an enlarged front view illustrating the coupled state of a pump and a first drying chamber of the nucleic acid test system provided with a multi-chamber cartridge according to an exemplary embodiment of the present invention.
Figure 13:
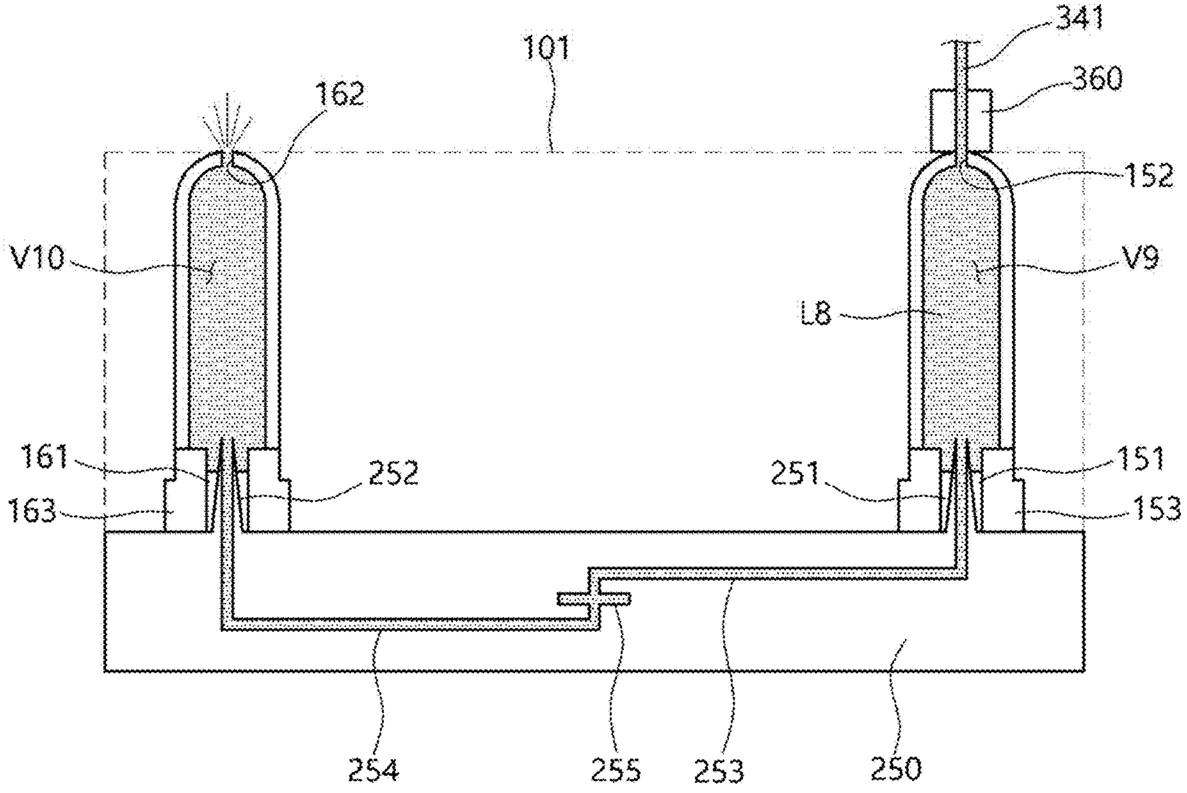
FIG. 13 is a cross-sectional view showing a state in which a pump and a first drying chamber of the nucleic acid test system provided with a multi-chamber cartridge according to an exemplary embodiment of the present invention are coupled.
Figure 14:
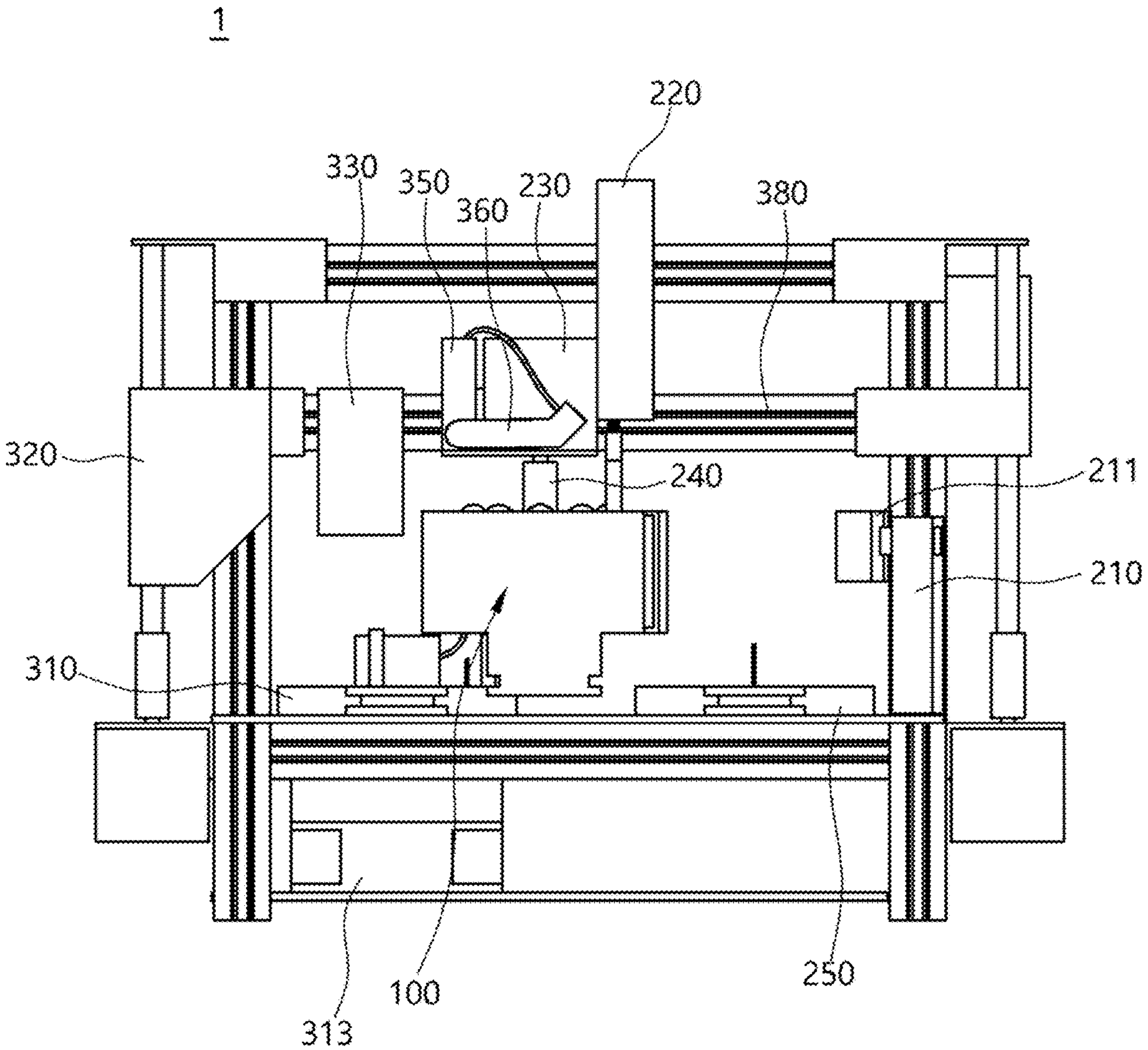
FIG. 14 is a cross-sectional view showing a state in which the first driving unit of the nucleic acid test system provided with a multi-chamber cartridge according to an exemplary embodiment of the present invention moves to the nucleic acid test module.
Figure 15:
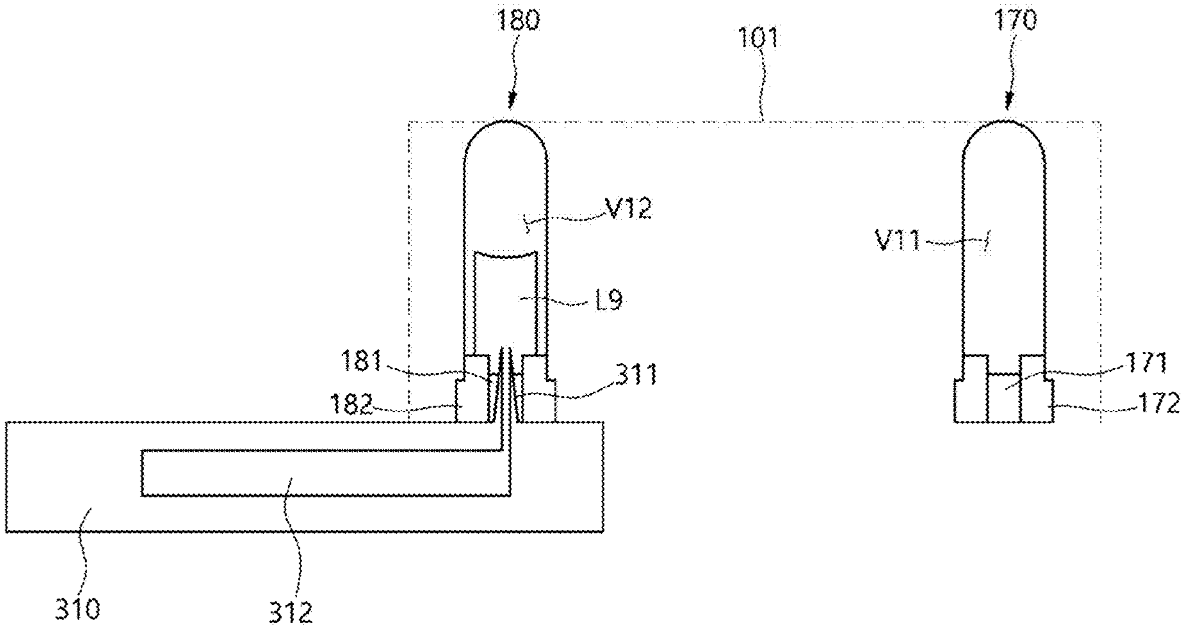
FIG. 15 is a cross-sectional view showing a state in which an inspection needle is coupled to a storage chamber of the nucleic acid test system provided with a multi-chamber cartridge according to an exemplary embodiment of the present invention.

FIG. 10 is a perspective view of an extraction base of the nucleic acid test system provided with a multi-chamber cartridge according to an exemplary embodiment of the present invention. FIG. 11 is a cross-sectional view of an extraction base and a multi-chamber cartridge of the nucleic acid test system provided with a multi-chamber cartridge according to an exemplary embodiment of the present invention. FIG. 12 is an enlarged front view illustrating the coupled state of a pump and a first drying chamber of the nucleic acid test system provided with a multi-chamber cartridge according to an exemplary embodiment of the present invention. FIG. 13 is a cross-sectional view showing a state in which a pump and a first drying chamber of the nucleic acid test system provided with a multi-chamber cartridge according to an exemplary embodiment of the present invention are coupled. FIG. 14 is a cross-sectional view showing a state in which the first driving unit of the nucleic acid test system provided with a multi-chamber cartridge according to an exemplary embodiment of the present invention moves to the nucleic acid test module. FIG. 15 is a cross-sectional view showing a state in which an inspection needle is coupled to a storage chamber of the nucleic acid test system provided with a multi-chamber cartridge according to an exemplary embodiment of the present invention.

As illustrated in FIG. 1, the first driving unit 230 transmits a rotational driving force to the cartridge body 101 through the rotating shaft member 240 which is coupled to the rotation axis I of the cartridge body 101. The first driving unit 230 may rotate the cartridge body 101 at a predetermined angle to perform a function of positioning each chamber at an injection needle 251 and a discharge needle 252, which will be described below, and also, the first driving unit 230 may perform a function of shaking by rotating the multi-chamber cartridge 100 in one direction and the other direction such that each sample can be sufficiently mixed in the process of sequentially mixing the fourth sample L5, the third sample L4, the second sample L3 and the first sample L2 with the basic sample L1 through the pressing member 220.

In addition, as illustrated in FIGS. 1 and 14, the first driving unit 230 provides a driving force for translational movement of the multi-chamber cartridge 100 in the vertical direction through the rotating shaft member 240.

The first driving unit 230 may reciprocate along a rail 380 that is supported by a frame 370 in which the first driving unit 230 itself is disposed perpendicularly to the upper side of an extraction base 250 and the upper side of an inspection base 310 on the ground. However, as long as the first driving unit 230 can reciprocate between the extraction base 250 and the inspection base 310, the shapes of the frame 370 and the rail 380 are not limited.

When the first driving unit 230 the movement of the multi-chamber cartridge 100 therefrom are described more specifically, the first driving unit 230 controls the vertical and rotational movements of the multi-chamber cartridge 100 while staying on the upper side of the extraction base 250.

In this case, the first driving unit 230 controls the multi-chamber cartridge 100 such that the sample chamber 110 and the waste sample chamber 120 accommodated in the multi-chamber cartridge 100, the washing liquid chamber 130 and the waste washing liquid chamber 140, the first drying chamber 150 and the second drying chamber 160, and the eluent chamber 170 and the storage chamber 180 can be sequentially coupled to the injection needle 251 and the discharge needle 252, which will be described below, respectively.

If the above-described process is described in detail through the process of passing the washing liquid chamber 130 and the waste washing liquid chamber 140 from the sample chamber 110 and the waste sample chamber 120, when the multi-chamber cartridge 100 is lowered such that the sample chamber 110 and the waste sample chamber 120 are coupled to the injection needle 251 and the discharge needle 252 so as to move the sample in the mixing space V1 to the waste sample space V6, the multi-chamber cartridge 100 is raised again, and after rotating the multi-chamber cartridge 100 at a predetermined angle such that the washing liquid chamber 130 and the waste washing liquid chamber 140 can be disposed on the upper sides of the injection needle 251 and the discharge needle 252, it is lowered again such that the washing liquid chamber 130 and the waste washing liquid chamber 140 are coupled to the injection needle 251 and the discharge needle 252.

The above-described process is performed in the order of the sample chamber 110 and the waste sample chamber 120, the washing liquid chamber 130 and the waste washing liquid chamber 140, the first drying chamber 150 and the second drying chamber 160, and the eluate chamber 170 and the storage chamber 180, until the eluate in which the nucleic acid is dissolved is stored in the storage chamber 180.

When the eluate in which the nucleic acid is dissolved is stored in the storage chamber 180, the first driving unit 230 moves upward of the inspection base 310 along the rail 380. In this case, as illustrated in FIG. 14, it moves to the extent to overlap the end of the inspection base 310 on the extraction base 250 side, that is, such that the storage chamber 180 can be disposed above the inspection needle 311 of the inspection base 310.

As illustrated in FIG. 15, in this state, the first driving unit 230 lowers the multi-chamber cartridge 100 such that the storage chamber 180 and the inspection needle 311 can be coupled, and the eluate of the storage chamber 180 is moved to a nucleic acid amplification chip 312. The nucleic acid that is moved to the nucleic acid amplification chip 312 together with the eluate is amplified inside the nucleic acid amplification chip 312, and the nucleic acid test module 300 identifies whether the nucleic acid corresponds to the target nucleic acid.

Referring to FIG. 1, the nucleic acid extraction module 200 of the nucleic acid test system 1 according to an exemplary embodiment of the present invention includes an extraction base 250, an injection needle 251 and a discharge needle 252.

As illustrated in FIGS. 1 and 10, the extraction base 250 is formed in a flat plate shape on the upper surface. An injection needle 251 and a discharge needle 252 are disposed on the upper surface of the extraction base 250 to face each other at both ends. In this case, the injection needle 251 and the discharge needle 252 are disposed to be spaced apart from each other with a predetermined distance, and may protrude to be parallel to each other.

In the injection needle 251 and the discharge needle 252, a flow path through which fluid can move is formed therein in the protruding longitudinal direction. That is, it is formed in a hollow shape. The injection needle 251 and the discharge needle 252 may be formed to be sharp so as to easily pass through a septum to be described below at the upper end.

The injection needle 251 and the discharge needle 252 are connected by a flow path that is formed inside the extraction base 250. When this is described more specifically, as illustrated in FIG. 10, the end of the injection needle 251 on the side of the extraction base 250 is connected to a first flow path 253 that is formed inside the extraction base 250. In addition, the end of the discharge needle 252 on the side of the extraction base 250 is connected to a second flow path 254 that is formed inside the extraction base 250.

The first flow path 253 and the second flow path 254 are connected to each other, and accordingly, the fluid flowing into the injection needle 251 passes through the inside of the extraction base 250 and is discharged through the discharge needle 252.

In this case, as illustrated in FIG. 10, a nucleic acid attachment member 255 is disposed between the first flow path 253 and the second flow path 254. The nucleic acid attachment member 255 serves to separate nucleic acids and other foreign substances from samples that are introduced through the first flow path 253. Accordingly, the nucleic acid is attached to the nucleic acid attachment member 255, and the remaining foreign matter is discharged through the second flow path 254. The nucleic acid attachment member 255 is not limited to the exemplary embodiment as long as it can separate nucleic acids from other materials. For example, it may be a silica membrane.

As illustrated in FIG. 10, the nucleic acid attachment member 255 may be formed in a disk shape and disposed inside the extraction base 250. In this case, the nucleic acid attachment member 255 in a plate shape may be disposed to be parallel to the upper surface of the extraction base 250 to widen the area where the sample introduced through the first flow path 253 contacts the nucleic acid attachment member 255.

In addition, the end of the first flow path 253 on the side of the nucleic acid attachment member 255 is connected to the center of the upper surface of the nucleic acid attachment member 255 such that the sample can smoothly pass through the extraction base 250, and the end of the second flow path 254 on the side of the nucleic acid attachment member 255 may be connected to the center of the lower surface of the nucleic acid attachment member 255. Through this, the sample can pass through the nucleic acid attachment member 255 more smoothly by gravity while moving in the direction of its own weight.

In this case, as illustrated in FIG. 11, the sample chamber 110 is coupled to the injection needle 251 to provide the sample to the nucleic acid attachment member 255. The mixing space V1 is sealed from the outside of the sample chamber 110. In this case, a sample cap 114 having a sample septum 115 is coupled to the end of the sample chamber 110 such that as the sample chamber 110 is coupled to the injection needle 251, the mixing space V1 can be connected to the first flow path 253.

The sample septum 115 may be coupled to the injection needle 251 as the sharp injection needle 251 penetrates the sample septum 115, and when separated from the injection needle 251, it is formed of a material that is capable of sealing the mixing space V1 from the outside again. For example, it may be formed of rubber, silicone and the like, but the present invention is not limited thereto.

As illustrated in FIG. 11, the sample septum 115 may be disposed at the center of the sample cap 114 that is coupled to one end of the sample chamber 110 with one end open. In this case, the sample septum 115 is formed such that the direction in which the injection needle 251 is inserted coincides with the extending direction of the sample chamber 110.

Meanwhile, as illustrated in FIG. 11, the waste sample chamber 120 is coupled to the discharge needle 252 so as to correspond to the coupling of the sample chamber 110 to the injection needle 251. In this case, since the shape of the waste sample chamber 120 and the configurations of the waste sample septum 121 and the waste sample cap 122 for coupling the waste sample chamber 120 to the discharge needle 252 are the same as the configuration of the sample chamber 110, the descriptions thereof will be omitted.

A waste sample space V6 corresponding to the mixing space V1 of the sample chamber 110 is formed inside the waste sample chamber 120. In this case, the waste sample space V6 is formed to have a pressure that is lower than the internal pressure of the mixing space V1. For example, in the initial state, the mixing space V1 may be formed to have a positive pressure and the waste sample space V6 may be formed to have a negative pressure, but the pressure inside the mixing space V1 is not limited to the value of the pressure at which the pressure inside the waste sample space V6 is formed to be low.

As the waste sample space V6 is coupled to the discharge needle 252, it is connected to the second flow path 254 to enable fluid communication. In this case, the waste sample chamber 120 is coupled to the discharge needle 252 and the injection needle 251 at the same time as the sample chamber 110.

To this end, when the sample chamber 110 and the waste sample chamber 120 are coupled to the multi-chamber cartridge 100 such that the sample chamber 110 and the waste sample chamber 120 are simultaneously inserted into the injection needle 251 and the discharge needle 252, respectively, the mixing space V1 and the waste sample space V6 are connected to each other to fluidly communicate by the first flow path 253 and the second flow path 254. In this case, since there is a difference in pressure between the mixing space V1 and the waste sample space V6, the mixed sample L6 that is stored in the mixing space V1 moves along the first flow path 253 due to the pressure difference.

As illustrated in FIG. 11, the moved mixed sample L6 passes through the nucleic acid attachment member 255 to separate nucleic acids, the separated nucleic acids remain attached to the nucleic acid attachment member 255, and other foreign substances move to the waste sample space V6 through the second flow path 254.

In this case, as illustrated in FIG. 11, while the injection needle 251 and the discharge needle 252 are disposed to face upward and the sample septum 115 and the waste sample septum 212 are disposed to face downward, the sample chamber 110 and the waste sample chamber 120 are coupled to the injection needle 251 and the discharge needle 252.

Accordingly, the mixed sample L6 is disposed on the lower side of the mixing space V1, that is, on the side of the sample septum 115 into which the injection needle 251 is inserted, and air is disposed on the upper side such that the sample can first move along the first flow path 253, and thus, it is possible to increase the efficiency of extracting nucleic acids.

Referring to FIG. 11, the nucleic acid extraction module 200 of the nucleic acid test system 1 according to an exemplary embodiment of the present invention includes a washing liquid chamber 130 and a waste washing liquid chamber 140. In this case, since the shapes of the washing liquid chamber 130 and the waste washing liquid chamber 140 and the configurations of the washing cap 132, the washing septum 131, the waste washing cap 142 and the waste washing septum 141 for coupling the injection needle 251 and the discharge needle 252, respectively, are the same as the configurations of the sample chamber 110 and the waste sample chamber 120, the descriptions thereof will be omitted.

A washing liquid space V7 in which the washing liquid L7 can be stored is formed inside the washing liquid space V7, and a waste washing liquid space V7 is formed inside the waste washing liquid chamber 140. In this case, the washing liquid L7 serves to move foreign substances other than the nucleic acid attached to the nucleic acid attachment member 255 to the waste washing liquid space V7. The washing liquid L7 may be, for example, an ethanol-based solution. By using an ethanol-based solution as the washing liquid L7, nucleic acids are better attached to the nucleic acid attachment member 255 to increase the extraction efficiency.

The washing liquid chamber 130 and the waste washing liquid chamber 130 are coupled to the injection needle 251 and the discharge needle 252, respectively, as in the sample chamber 110 and the waste sample chamber 120, and by using a pressure difference between the washing liquid space V7 and the waste washing liquid space V7, the washing liquid L7 in the washing liquid space V7 moves along the first flow path 253, and after washing the nucleic acid attachment member 255, it moves along the second flow path 254 to the waste washing liquid space V7.

In this case, the washing liquid chamber 130 and the waste washing liquid chamber 140 of the nucleic acid extraction module 200 according to an exemplary embodiment of the present invention may be provided in plurality. Accordingly, by repeating the washing process described above multiple times, it is possible to prevent the nucleic acid detection efficiency from deteriorating as residual foreign substances remain in the nucleic acid attachment member 255.

Referring to FIGS. 1 and 12, the nucleic acid extraction module 200 according to an exemplary embodiment of the present invention includes a pump 340, a first drying chamber 150 and a second drying chamber 160. In this case, since the shapes of the first drying chamber 150 and the second drying chamber 160 and the configurations of the first drying cap 153, the first drying septum 151, the second drying cap 163 and the second drying septum 161 for coupling to the injection needle 251 and the discharge needle 252, respectively, are the same as the configurations of the sample chamber 110 and the waste sample chamber 120, the descriptions thereof will be omitted.

The pump 340 provides drying gas L8. The type of pump 340 is not limited as long as it can provide the drying gas L8, and known equipment may be used.

The drying gas L8 provided by the pump 340 moves into the first drying chamber 150. As illustrated in FIG. 13, the first drying chamber 150 has a first drying space V9 formed therein, and a first through-hole 152 is formed at the end opposite to the side on which the first drying septum 151 is disposed so as to be connected to the pump 340. The pump 340 is connected to the first through-hole 152 by a drying arm 360 and a hose 341, which will be described in detail below.

As illustrated in FIG. 13, when the pump 340 is operated while the first drying chamber 150 and the second drying chamber 160 are coupled to the injection needle 251 and the discharge needle 252, respectively, the drying gas L8 passes through the first flow path 253, the nucleic acid attachment member 255 and the second flow path 254 by the pump 340 to remove the washing liquid L7 described above.

The drying gas L8 is discharged to the outside through a second through-hole 162 that is formed in the second drying chamber 160 via the second drying space V10 that is formed inside the second drying chamber 160. Accordingly, the nucleic acid attachment member 255 is dried, and the nucleic acid to be amplified remains on the nucleic acid attachment member 255.

Referring to FIG. 11, the nucleic acid extraction module 200 of the nucleic acid test system 1 according to an exemplary embodiment of the present invention includes an eluate chamber 170 and a storage chamber 180. In this case, since the shapes of the eluent chamber 170 and the storage chamber 180 and the configurations of the elution cap 172, the elution septum 171, the storage cap 182 and the storage septum 181 for coupling to the injection needle 251 and the discharge needle 252, respectively, are the same as the configurations of the sample chamber 110 and the waste sample chamber 120, the descriptions thereof will be omitted.

An eluate space V11 in which the eluate L9 can be stored is formed inside the eluate chamber 170. The eluate L9 stored in the eluate space V11 is coupled to the injection needle 251 and the discharge needle 252, respectively, as in the sample chamber 110 and the waste sample chamber 120, and by using a pressure difference between the eluate space V11 and the storage space V12, after the eluate 17 of the eluate space V11 moves along the first flow path 253 and dissolves the nucleic acid attached to the nucleic acid attachment member 255, it moves together with the nucleic acid along the second flow path 252 to the storage space V12.

The nucleic acid moved to the storage space V12 is amplified and identified by the nucleic acid test module 300. Referring to FIGS. 1 and 14, the nucleic acid extraction module 200 of the nucleic acid test system 1 according to an exemplary embodiment of the present invention includes an inspection base 310 and an inspection needle 311.

As illustrated in FIG. 14, the inspection base 310 is formed in a plate shape with a flat upper surface. The inspection base 310 is disposed on one side of the extraction base 250.

The nucleic acid amplification chip 312 amplifies the nucleic acid through a polymerase chain reaction when nucleic acid is introduced. In this case, known components may be used for the nucleic acid amplification chip 312, and the detailed description thereof will be omitted.

As illustrated in FIG. 15, the inspection needle 311 is formed on the upper surface of the inspection base 310 on the side of the extraction base 250. The inspection needle 311 may protrude to be parallel to the injection needle 251 and the discharge needle 252. Since the inspection needle 311, the injection needle 251 and the discharge needle 252 are arranged in parallel, the above-described chambers may be automatically coupled to the inspection needle 311, the injection needle 251 and the discharge needle 252 by using the multi-chamber cartridge 100.

As illustrated in FIG. 15, the inspection needle 311 is formed with a flow path through which fluid can move in the protruding longitudinal direction. That is, it is formed in a hollow shape. Similar to the injection needle 251 and the discharge needle 252, the inspection needle 311 may also have an upper end that is formed to be sharp so as to easily pass through the septum of each chamber.

The inspection needle 311 is connected to the nucleic acid amplification chip 312 that is installed on the inspection base 310. In this case, the pressure inside the nucleic acid amplification chip 312 is formed to be smaller than the pressure in the storage space V12 of the storage chamber 180. For example, although the pressure inside the nucleic acid amplification chip 312 may be formed to have a negative pressure or the storage space V12 may be formed to have a positive pressure, there is no limitation on the pressure value that is formed to be lower than the pressure of the storage space V12.

Accordingly, when the inspection needle 311 penetrates the storage septum 181 of the storage chamber 180, the eluate L9 that is stored in the storage space V12 is moved to the inside of the nucleic acid amplification chip 312 due to the internal pressure of the nucleic acid amplification chip 312 and the pressure difference of the storage space V12.

The nucleic acid moved into the nucleic acid amplification chip 312 is amplified to be detectable through a polymerase chain reaction. In this case, in the nucleic acid amplification process, it is necessary to control the temperature for the reaction of enzyme.

To this end, as illustrated in FIGS. 1 and 14, the nucleic acid test system 1 provided with the nucleic acid extraction module 200 according to an exemplary embodiment of the present invention may further include a second heater 313.

The second heater 313 is disposed below the inspection base 310 to control the temperature of the nucleic acid amplification chip 312. As the second heater 313, a known device may be used as long as it can control the temperature of the nucleic acid amplification chip 312, and the operation method is not limited.

In order to determine the type of nucleic acid that is transferred from the storage chamber 180 to the nucleic acid amplification chip 312 and amplified, the nucleic acid test module 300 includes a light irradiation unit 320 and a light detection unit 330. When light is irradiated on the nucleic acid amplification chip through the light irradiation unit 320, the light detection unit 330 detects a specific fluorescent signal that is reflected from the nucleic acid amplification chip 312, when target nucleic acids exist.

Accordingly, it is possible to determine the type of nucleic acid being sensed by using the fluorescent signal that is collected through the light detection unit 330.

Meanwhile, referring to FIGS. 1, 12 and 13, the nucleic acid test system 1 provided with the nucleic acid extraction module 200 according to an exemplary embodiment of the present invention may further include a second driving unit 350 and a drying arm 360.

The second driving unit 350 is disposed on one side of the first driving unit 230 to provide a rotational driving force. In this case, the second driving unit 350 may be integrally formed with the first driving unit 230, and there is no limitation thereon.

A drying arm 360 that pivotally rotates is coupled to the second driving unit 350. When the first drying chamber 150 is coupled to the injection needle 251, the drying arm 360 is pivotally rotated so as to be coupled to the first through-hole 152 that is formed at the upper end of the injection needle 251.

In this case, the drying arm 360 is connected to the pump 340, and the drying gas L8 of the pump 340 can be injected into the first drying chamber 150 through the first through-hole 152. The pump 340 and the drying arm 360 may be connected by the hose 341, but as long as the drying gas L8 of the pump 340 can be provided through the drying arm 360, there is no limitation thereon. In this case, the injected drying gas L8 is discharged to the outside through the second through-hole 162 of the second drying chamber 160 as described above.

As described above, the preferred exemplary embodiments according to the present invention have been reviewed, and the fact that the present invention can be embodied in other specific forms without departing from the spirit or scope in addition to the above-described embodiments is a matter that is apparent to those of ordinary skill in the art. It is self-evident to them. Therefore, the foregoing exemplary embodiments are to be regarded as illustrative rather than restrictive, and thus, the present invention is not limited to the foregoing description, but may be modified within the scope of the appended claims and their equivalents.

EXPLANATION OF REFERENCE NUMERALS

| | |
|---|---|
| 1: Nucleic acid test system | 151: First dry septum |
| 100: Multi-chamber cartridge | 152: First through-hole |
| 101: Cartridge body | 153: First dry cap |
| 102: Accommodating part | |
| 160: Second drying chamber | |
| 103: Opening | 161: Second dry septum |
| 110: Sample chamber | 162: Second through-hole |
| 111: Sample chamber body | 163: Second drying cap |
| 112a: First tube | 170: Eluate chamber |
| 112b: Second tube | 171: Elution septum |
| 112c: Third tube | 172: Elution cap |
| 112d: Fourth tube | 180: Storage chamber |
| 113a: First pressure gasket | 181: Storage septum |
| 113b: Second pressure gasket | 182: Storage cap |
| 113c: Third pressure gasket | |
| 200: Nucleic acid extraction module | |
| 113d: Fourth pressure gasket | 210: First heater |
| 114: Sample cap | 211: Heating element |
| 115: Sample septum | 220: Pressing member |
| 116a: First plunger | 221: Spring member |
| 116b: Second plunger | 222: Coupling protrusion |
| 116c: Third plunger | 223: Coupling groove |
| 116d: Fourth plunger | 230: First driving unit |
| 117: Locking part | |
| 240: Rotating shaft member | |
| 117a: First locking protrusion | 250: Extraction base |
| 117b: Second locking protrusion | 251: Injection needle |
| 118a, 118a', 118a'': First separation gasket | 252: Discharge needle |
| 118b, 118b', 118b'': Second separation gasket | 253: First flow path |
| 118c, 118c', 118c'': Third separation gasket | 254: Second flow path |
| 118d, 118d', 118d'': Fourth separation gasket | |
| 255: Nucleic acid attachment member | |
| 119a, 119a': First drilling member | |
| 300: Nucleic acid test module | |
| 119b, 119b': Second drilling member | 310: Inspection base |
| 119c, 119c': Third drilling member | 311: Inspection needle |
| 119d, 119d': Fourth drilling member | |
| 312: Nucleic acid amplification chip | |
| 120: Waste sample chamber | 313: Second heater |
| 121: Waste sample septum | 320: Light irradiation unit |
| 122: Waste sample cap | 330: Light detection unit |
| 130: Washing liquid chamber | 340: Pump |
| 131: Washing septum | 341: Hose |
| 132: Washing cap | 350: Second driving unit |
| 140: Waste washing liquid chamber | 360: Drying arm |
| 141: Waste washing septum | 370: Frame |
| 142: Waste washing cap | 380: Rail |
| 150: First drying chamber | 390: Bottom part |

The invention claimed is:

1. A multi-chamber cartridge, comprising:

a sample chamber comprising a hollow elongated first tube, a sample chamber body in which a mixing space is formed and one end of the first tube is disposed in the mixing space, a first pressure gasket coupled to an inside of the first tube and is configured to be movable along an inner peripheral surface of the first tube, a first separation gasket which is disposed below a first surface of the first pressure gasket, coupled to the inside of the first tube and configured to be movable along the inner peripheral surface of the first tube, and a first plunger having a first end coupled to a second surface of the first pressure gasket and pressing the first pressure gasket; and a cartridge body which comprises an accommodating part in which the sample chamber is detachably accommodated, wherein the first tube comprises a first sample space which is defined by a first inner surface of the first tube, a first surface of the first separation gasket and the first surface of the first pressure gasket, wherein a sample is placed in the mixing space, wherein a first sample is placed in the first sample space, and wherein the first sample is transferred to the mixing space as the first separation gasket is separated from the first tube and as the other end of the first plunger is pressed toward the mixing space.

2. The multi-chamber cartridge of claim 1, wherein the first tube is formed such that the cross-sectional area which is perpendicular to a longitudinal direction of the first tube in an inner space of the first tube is smaller than the cross-sectional area which is perpendicular to an extending direction of the first tube in the mixing space.

3. The multi-chamber cartridge of claim 1, wherein the sample chamber further comprises:

a second separation gasket which is disposed below a second surface of the first separation gasket, coupled to the inside of the first tube and is configured to be movable along the inner peripheral surface of the first tube, wherein the first tube further comprises a second sample space which is defined by a second inner surface of the first tube, the second surface of the first separation gasket and a first surface of the second separation gasket.

4. The multi-chamber cartridge of claim 3, wherein a second sample is placed in the second sample space, and wherein the second sample and the first sample are sequentially transferred to the mixing space as the second separation gasket and the first separation gasket are sequentially separated from the first tube as the other end of the first plunger is pressed toward the mixing space.

5. The multi-chamber cartridge of claim 1, wherein the sample chamber further comprises:

a hollow elongated second tube, arranged side by side with the first tube and extended in length, one end of which is disposed in the mixing space;

a second pressure gasket coupled to an inside of the second tube and is configured to be movable along an inner peripheral surface of the second tube; and a second separation gasket which is disposed below a first surface of the second pressure gasket, coupled to the inside of the second tube and configured to be movable along the inner peripheral surface of the second tube.

6. The multi-chamber cartridge of claim 1, wherein the first plunger is screw-coupled to a first side of the inner peripheral surface of the first tube.

7. The multi-chamber cartridge of claim 1, wherein the sample chamber further comprises:

a locking part for limiting a movement direction of the first plunger such that the first plunger is movable only in a direction toward the mixing space.

8. The multi-chamber cartridge of claim 7, wherein the locking part comprises:

a first locking protrusion which protrudes such that a first inclined surface is formed on a first side of an outer peripheral surface of the first plunger toward the mixing space, and a first locking surface is formed toward a direction opposite to a direction toward the mixing space; and a second locking protrusion which is formed in plurality at a predetermined interval along a longitudinal direction of the first tube in which a second inclined surface is formed on a first side of the inner peripheral surface of the first tube in a direction opposite to the direction toward the mixing space and protrudes such that a second locking surface is formed toward the mixing space, wherein the first locking protrusion and the second locking protrusion are elastically deformed such that the first plunger is configured to move toward the mixing space while the first locking protrusion and the second locking protrusion are arranged side by side.

9. The multi-chamber cartridge of claim 8, wherein the first plunger is configured to move in the direction opposite to the direction toward the mixing space while the first and second locking protrusions are disposed to be misaligned.

10. A nucleic acid extraction module provided with a multi-chamber cartridge, comprising:

the multi-chamber cartridge according to claim 1, which further comprises an opening that is formed to expose one side of the sample chamber to the outside; and a first heater which comprises a heating unit for heating the one side of the sample chamber through the opening by controlling time and temperature.

11. The nucleic acid extraction module of claim 10, wherein the heating unit is disposed adjacent to the one side of the sample chamber to heat the sample chamber and configured to reciprocate so as to be separated from the sample chamber when the heating is finished.

12. The nucleic acid extraction module of claim 11, wherein the heating unit is formed in a shape corresponding to the one side of the sample chamber to increase a contact area with the one side of the sample chamber.

13. A nucleic acid extraction module provided with a multi-chamber cartridge, further comprising:

the multi-chamber cartridge of claim 1; and a pressing member for separating the first separation gasket from the first tube into the mixing space by pressing a second end of the plunger such that the first sample is transferred from the first sample space to the mixing space.

14. The nucleic acid extraction module of claim 13, wherein the plunger is screw-coupled to one side of the inner peripheral surface of the first tube, and wherein the pressing member is coupled to the second side of the plunger and presses the first plunger to rotate in one direction or the other direction.

15. The nucleic acid extraction module of claim 14, further comprising:

a spring member for providing an elastic force to the second side of the plunger such that the pressing member remains coupled to the second side of the plunger.

16. A nucleic acid extraction module provided with a multi-chamber cartridge, further comprising:

the multi-chamber cartridge of claim 1; and a first driving unit for rotating the multi-chamber cartridge in one direction or the other direction with an axis parallel to an extension direction of the first tube as a central axis such that the first sample and the sample are mixed.

* * * * *